United States Patent
Joseph et al.

(10) Patent No.: US 8,551,616 B2
(45) Date of Patent: Oct. 8, 2013

(54) ADHESIVE COMPOSITIONS WITH MULTIPLE TACKIFIERS

(75) Inventors: Eugene G. Joseph, Blacksburg, VA (US); Vivek Bharti, Cottage Grove, MN (US); Jingjing Ma, Cottage Grove, MN (US); Michael L. Tumey, St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 354 days.

(21) Appl. No.: 12/994,877

(22) PCT Filed: Apr. 28, 2009

(86) PCT No.: PCT/US2009/041875
§ 371 (c)(1),
(2), (4) Date: Nov. 29, 2010

(87) PCT Pub. No.: WO2009/146227
PCT Pub. Date: Dec. 3, 2009

(65) Prior Publication Data
US 2011/0135922 A1    Jun. 9, 2011

Related U.S. Application Data

(60) Provisional application No. 61/057,532, filed on May 30, 2008.

(51) Int. Cl.
*C09J 153/00* (2006.01)
*C09J 193/04* (2006.01)

(52) U.S. Cl.
USPC .............. 428/355 EN; 428/355 AC; 524/272; 524/500

(58) Field of Classification Search
USPC .............. 428/355 AC, 355 EN; 524/272, 500
See application file for complete search history.

(56) References Cited

U.S. PATENT DOCUMENTS

| | | | |
|---|---|---|---|
| 4,749,590 A | 6/1988 | Klingen | |
| 5,024,880 A | 6/1991 | Veasley | |
| 5,667,692 A | 9/1997 | Müller | |
| 5,874,143 A | 2/1999 | Peloquin | |
| 6,197,845 B1 * | 3/2001 | Janssen et al. | 523/111 |
| 6,538,091 B1 | 3/2003 | Matyjaszewski | |

(Continued)

FOREIGN PATENT DOCUMENTS

| | | |
|---|---|---|
| EP | 0349232 | 1/1990 |
| EP | 1842888 | 10/2007 |

(Continued)

OTHER PUBLICATIONS

Arakawa Technical Data Sheet for SUPERESTER W-series resins (Aug. 1998), available at http://www.dbbecker.com/arakawa-chemical-inc (accessed Jan. 10, 2013).*

(Continued)

*Primary Examiner* — Gerard Higgins
*Assistant Examiner* — Scott R Walshon
(74) *Attorney, Agent, or Firm* — Jean A. Lown

(57) ABSTRACT

Adhesive compositions and articles that contain these adhesive compositions are described. More particularly, the adhesive compositions include (a) a block copolymer prepared from monoethylenically unsaturated monomers and (b) a tackifier mixture. The adhesives compositions can be adhered to many substrates including those having a non-polar surface.

20 Claims, 1 Drawing Sheet

(56) References Cited

U.S. PATENT DOCUMENTS

| | | |
|---|---|---|
| 6,630,554 B1 | 10/2003 | Hamada |
| 6,734,256 B1 | 5/2004 | Everaerts |
| 6,806,320 B2 | 10/2004 | Everaerts |
| 6,887,962 B2 | 5/2005 | Matyjaszewski |
| 6,894,114 B2 | 5/2005 | Kato |
| 7,084,209 B2 | 8/2006 | Everaerts |
| 7,250,479 B2 | 7/2007 | Le |
| 7,255,920 B2 | 8/2007 | Everaerts |
| 7,307,115 B2 | 12/2007 | Husemann |
| 2003/0114560 A1 | 6/2003 | Yang |
| 2003/0119970 A1 | 6/2003 | Husemann |
| 2004/0034124 A1 | 2/2004 | Court |
| 2005/0020773 A1* | 1/2005 | Lechat et al. ............ 525/89 |
| 2005/0182182 A1 | 8/2005 | Morishita |
| 2006/0099411 A1 | 5/2006 | Xia |
| 2006/0165936 A1* | 7/2006 | Kasahara et al. ......... 428/40.1 |
| 2006/0279923 A1 | 12/2006 | Kim |
| 2010/0098962 A1* | 4/2010 | Hanley et al. ............ 428/521 |
| 2011/0135921 A1 | 6/2011 | Tse |

FOREIGN PATENT DOCUMENTS

| | | |
|---|---|---|
| JP | 11-302617 | 11/1999 |
| JP | 11-323072 | 11/1999 |
| WO | WO 00/39233 | 7/2000 |
| WO | WO 2004/046215 | 6/2004 |
| WO | WO 2008073669 A1 * | 6/2008 |

OTHER PUBLICATIONS

International Search Report for PCT/US2009/041875, 3 pgs.
Written Opinion of the ISA for International Application No. PCT/US2009/041875, 5 pgs.
Cheng, "Using Analytical Techniques to Characterize Adhesives", Adhesives Age, Dec. 1988, pp. 37-41.
Hamada, "Characteristics and Application of Novel Acrylic Block Copolymers", Proceedings of The 30th Annual Meeting of The Adhesion Society, Tampa, FL, pp. 307-308, (2007).
Jeusette, "Study of the Miscibility Between New "All-Acrylate" Block Copolymers and a Rosin Ester Resin", Proceedings of The 30th Annual Meeting of The Adhesion Society, Tampa, FL, pp. 309-311, (2007).
Tong, "Morphology and rheology of poly(methyl methacrylate)-*block*-poly(isooctyl acrylate)-*block*-poly(methyl methacrylate) triblock copolymers, and potential as thermoplastic elastomers", Macromol. Chem. Phys., 2000, vol. 201, pp. 1250-1258.
Tong, "Synthesis of poly(methyl methacrylate)-b-poly(*n*-butyl acrylate)-b-poly(methyl methacrylate) triblocks and their potential as thermoplastic elastomers", Polymer, Mar. 2000, vol. 41, Issue 7, pp. 2499-2510.

* cited by examiner

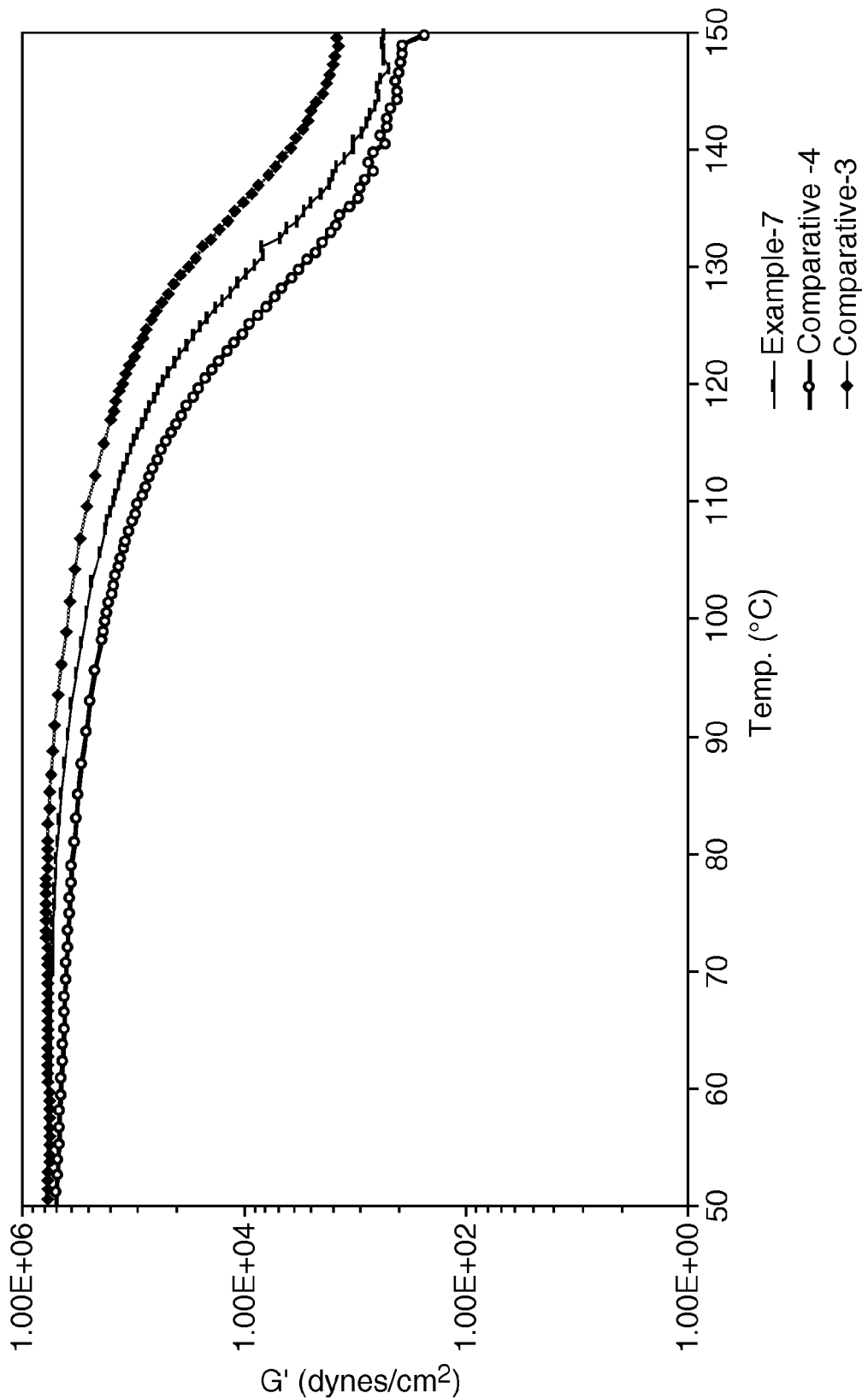

ADHESIVE COMPOSITIONS WITH MULTIPLE TACKIFIERS

CROSS REFERENCE TO RELATED APPLICATIONS

This application is a national stage filing under 35 U.S.C. 371 of PCT/US2009/041875, filed Apr. 28, 2009, which claims priority to Provisional Application No. 61/057,532, filed May 30, 2008, the disclosure of which is incorporated by reference in its/their entirety herein.

TECHNICAL FIELD

Adhesive compositions and articles that contain these adhesive compositions are described.

BACKGROUND

Pressure sensitive adhesives have been used for many applications and often contain a polymer prepared from various (meth)acrylic-type monomers. The (meth)acrylic-type monomers that are chosen to prepare this polymer often include polar monomers such as (meth)acrylic acid. Polar monomers tend to increase the cohesive strength and the shear adhesion performance of the adhesive compositions. When (meth)acrylic acid monomers are included, the resulting polymers often have relatively strong adhesion to a substrate with a polar surface but have relatively low adhesion to other substrates with a non-polar surface.

To increase adhesion to various substrates, adhesive compositions often include a tackifier. Many tackifiers suitable for adhesive compositions are known.

SUMMARY

Adhesive compositions and articles that contain these adhesive compositions are described. More particularly, the adhesive compositions include (a) a block copolymer prepared from monoethylenically unsaturated monomers and (b) a tackifier mixture. The adhesives compositions can be adhered to many substrates including those having a non-polar surface.

In a first aspect, an adhesive composition is provided. The adhesive composition includes (a) a block copolymer and (b) a tackifier mixture. The block copolymer has at least two A endblock polymeric units and at least one B midblock polymeric unit. Each A endblock polymeric unit is derived from a first monoethylenically unsaturated monomer selected from a methacrylate, styrene, or mixture thereof. The glass transition temperature of each A endblock is at least 50° C. Each B midblock polymeric unit is derived from a second monoethylenically unsaturated monomer selected from a (meth)acrylate, vinyl ester, or mixture thereof. The glass transition temperature of each B midblock is no greater than 20° C. The tackifier mixture includes a first solid tackifier, a second solid tackifier, and a third liquid tackifier. The first solid tackifier has a glass transition temperature equal to at least 20° C. and contains at least 70 weight percent of a first rosin acid, a first rosin ester, or mixture thereof having zero or one carbon-carbon double bond. The second solid tackifier has a glass transition temperature equal to at least 20° C. and contains no greater than 50 weight percent of the first rosin acid, the first rosin ester, or mixture thereof having zero or one carbon-carbon double bond. The third liquid tackifier has a glass transition temperature less than or equal to 0° C.

In a second aspect, an article is provided that includes a substrate and an adhesive composition adhered to a surface of the substrate. The adhesive composition is the same as described above that includes (a) a block copolymer and (b) a tackifier mixture that contains 1) a first solid tackifier, 2) a second solid tackifier, and 3) a third liquid tackifier.

In a third aspect, an adhesive composition is provided. The adhesive composition includes (a) a block copolymer and (b) a tackifier mixture. The block copolymer has at least two A endblock polymeric units and at least one B midblock polymeric unit. Each A endblock polymeric unit is derived from a first monoethylenically unsaturated monomer selected from a methacrylate, styrene, or a mixture thereof. The glass transition temperature of each A endblock is at least 50° C. Each B midblock polymeric unit is derived from a second monoethylenically unsaturated monomer selected from a (meth)acrylate, vinyl ester, or mixture thereof. The glass transition temperature of each B midblock is no greater than 20° C. The tackifier mixture includes (1) 30 to 70 weight percent weight percent of a first rosin acid, first rosin ester, or mixture thereof having zero or one carbon-carbon bond, (2) 10 to 40 weight percent of a second rosin acid, second rosin ester, or mixture thereof having two carbon-carbon double bonds, and (3) 10 to 50 weight percent of a third rosin acid, third rosin ester, or mixture thereof having three carbon-carbon double bonds.

In a fourth aspect, an article is provided that includes a substrate and an adhesive composition adhered to a surface of the substrate. The adhesive composition is the same as described above that includes (a) a block copolymer and (b) a tackifier mixture that contains (1) 30 to 70 weight percent weight percent of a first rosin acid, first rosin ester, or mixture thereof having zero or one carbon-carbon bond, (2) 10 to 40 weight percent of a second rosin acid, second rosin ester, or mixture thereof having two carbon-carbon double bonds, and (3) 10 to 50 weight percent of a third rosin acid, third rosin ester, or mixture thereof having three carbon-carbon double bonds.

The above summary of the present invention is not intended to describe each embodiment or every implementation of the present invention. The Figures, Detailed Description, and Examples that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 1 is a plot of shear modulus as a function of temperature for an exemplary adhesive composition and for two comparative adhesive compositions.

DETAILED DESCRIPTION OF THE INVENTION

Adhesive compositions and articles that contain the adhesive compositions are provided. More particularly, the adhesive compositions include a block copolymer plus a tackifier mixture. The tackifier mixture can be selected to modify the glass transition temperature of the block copolymer while maintaining the transparency of the adhesive composition. The tackifier mixture includes a mixture of rosin acids, rosin esters, or combinations thereof with varying degrees of unsaturation. The adhesive composition can typically adhere to a variety of substrates including those that have a non-polar or low energy surface. For example, the adhesive composition can adhere to a polyolefin surface.

The terms "a", "an", and "the" are used interchangeably with "at least one" to mean one or more of the elements being described.

Any stated range typically includes the endpoints and all numbers between the endpoints. For example, the range of 1 to 10 includes 1, 10, and all numbers between 1 and 10. The numbers are often integers.

The term "room temperature" refers to a temperature in the range of 20° C. to 25° C.

The term "and/or" means either or both. For example, the expression rosin acid and/or rosin ester means a rosin acid, a rosin ester, or both the rosin acid and the rosin ester (e.g., a mixture of the rosin acid and the rosin ester).

Block Copolymer

As used herein, the terms "polymer" and "polymeric" refer to a polymeric material or to a polymeric unit such as a polymeric block that is a homopolymer or copolymer. Similarly, the terms "polymerize" and "polymerization" refer to the process of making a polymeric material or polymeric unit. The term "homopolymer" refers to a polymeric material or to a polymeric unit such as a polymeric block that is the reaction product of one monomer. That is, the homopolymer is derived from a single monomer. The term "copolymer" refers to a polymeric material or to a polymeric unit such as a polymeric block that is the reaction product of at least two different monomers. That is, the copolymer is derived from multiple monomers.

As used herein, the term "block copolymer" refers to a polymeric material that includes multiple polymeric blocks that are covalently bonded to each other. The block copolymers usually include at least two different polymeric blocks that are referred to as the A block and the B block. The A block and the B block typically have different chemical compositions and different glass transition temperatures. The A block polymeric units as well as the B block polymeric units are derived from monoethylenically unsaturated monomers. Each polymeric block and the resulting block copolymer have a saturated polymeric backbone without the need for subsequent hydrogenation.

The block copolymer has at least two A endblock polymeric units and at least one B midblock polymeric unit. As used herein, the term "endblock" refers to the terminal regions of the block copolymer and the term "midblock" refers to the central region of the block copolymer. Each of the A endblock polymeric units are covalently bonded to the B midblock polymeric unit. The terms "A block" and "A endblock" are used interchangeably herein. Likewise, the terms "B block" and "B midblock" are used interchangeably herein.

The block copolymer with at least two A block and a least one B block can be a triblock copolymer of formula A-B-A or a star block copolymer having at least three segments of formula (A-B)—. Triblock copolymers typically have a linear structure with the B block in the central region and the A blocks in the terminal regions. Star block copolymers often have a central region from which various branches extend. The B blocks are typically in the central regions and the A blocks are in the terminal regions of the star block copolymers.

The A blocks tend to be more rigid than the B block. That is, the A blocks tend to have a higher glass transition temperature and are harder than the B block. As used herein, the term "glass transition temperature" or "$T_g$" refers to the temperature at which a polymeric material transitions from a glassy state to a rubbery state. The glassy state is typically associated with a material that is, for example, brittle, stiff, rigid, or a combination thereof. In contrast, the rubbery state is typically associated with a material that is, for example, flexible and elastomeric. The glass transition temperature can be determined using a method such as Differential Scanning calorimetry (DSC) or Dynamic Mechanical Analysis (DMA). The A blocks have a glass transition temperature of at least 50° C. and the B block has a glass transition temperature no greater than 20° C. In many exemplary block copolymers, the A blocks have a $T_g$ of at least 60° C., at least 80° C., at least 100° C., or at least 120° C. while the B block has a glass transition temperature no greater than 10° C., no greater than 0° C., no greater than −5° C., or no greater than −10° C.

The A block polymeric units tend to be thermoplastic materials whereas the B block polymeric unit tends to be an elastomeric material. As used herein, the term "thermoplastic" refers to a polymeric material that flows when heated and that returns to its original state when cooled back to room temperature. As used herein, the term "elastomeric" refers to a polymeric material that can be stretched to at least twice its original length and then retracted to approximately its original length upon release. The B block is usually considered to be a soft block while the A blocks are considered to be hard blocks.

The solubility parameter of the A blocks is typically sufficiently different than the solubility parameter of the B block. Stated differently, the A blocks are typically not compatible or miscible with the B block resulting in phase separation of the A blocks from the B block. The block copolymer has a multiphase morphology, at least at temperatures in the range of about 20° C. to 150° C. The block copolymer can have distinct regions of reinforcing A block domains (e.g., nanodomains) in a matrix of the softer, elastomeric B block. For example, the block copolymer can have a discrete, discontinuous A block phase in a substantially continuous B block phase. In some such examples, the concentration of A block polymeric units is no greater than about 35 weight percent of the block copolymer. The A blocks usually provide the structural and cohesive strength for the block copolymer.

The monoethylenically unsaturated monomers that are suitable for the A block polymeric units usually have a $T_g$ of at least 50° C. when reacted to form a homopolymer. In many examples, suitable monomers for the A block polymeric units have a $T_g$ of at least 60° C., at least 80° C., at least 100° C., or at least 120° C. when reacted to form a homopolymer. The $T_g$ of these homopolymers can be up to 200° C. or up to 150° C. The $T_g$ of these homopolymers can be, for example, in the range of 50° C. to 200° C., 50° C. to 150° C., 60° C. to 150° C., 80° C. to 150° C., or 100° C. to 150° C. In addition to these monomers having a $T_g$ of at least 50° C. when reacted to form a homopolymer, other monomers can be included in the A block provided the $T_g$ of the A block remains at least 50° C.

The A block polymeric units are typically derived from methacrylate monomers, styrenic monomers, or a mixture thereof. That is, the A block polymeric units are the reaction product of a first monoethylenically unsaturated monomer that is selected from a methacrylate monomer, styrenic monomer, or mixture thereof. As used herein to describe the monomers used to form the A block polymeric units, the term "mixture thereof" means that more than one type of monomer (e.g., a methacrylate and styrene) or more than one of the same type of monomer (e.g., two different methacrylates) can be mixed. The at least two A blocks in the block copolymer can be the same or different. In many block copolymers all of the A block polymeric units are derived from the same monomer or monomer mixture.

In many embodiments, methacrylate monomers are reacted to form the A blocks. That is, the A blocks are derived from methacrylate monomers. Any methacrylate monomers can be used as long as the $T_g$ of the resulting A block is at least 50° C. The methacrylate monomers can be, for example, alkyl methacrylates, aryl methacrylates, or aralkyl methacrylate of Formula (I).

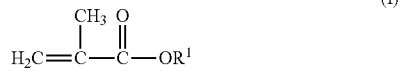

(I)

In Formula (I), $R^1$ is an alkyl, aryl, or aralkyl (i.e., an alkyl substituted with an aryl group). Suitable alkyl groups often have 1 to 6 carbon atoms, 1 to 4 carbon atoms, or 1 to 3 carbon atoms. When the alkyl group has more than 2 carbon atoms, the alkyl group can be branched or cyclic. Suitable aryl groups often have 6 to 12 carbon atoms. Suitable aralkyl groups often have 7 to 18 carbon atoms.

Exemplary alkyl methacrylates according to Formula (I) include, but are not limited to, methyl methacrylate, ethyl methacrylate, isopropyl methacrylate, isobutyl methacrylate, tert-butyl methacrylate, and cyclohexyl methacrylate. In addition to the monomers of Formula (I), isobornyl methacrylate can be used. Exemplary aryl (meth)acrylates according to Formula (I) include, but are not limited to, phenyl methacrylate. Exemplary aralkyl methacrylates according to Formula (I) include, but are not limited to, benzyl methacrylate and 2-phenoxyethyl methacrylate.

In other embodiments, the A blocks polymeric units are derived from styrenic monomers. Exemplary styrenic monomers that can be reacted to form the A blocks include, but are not limited to, styrene, alpha-methylstyrene, and various alkyl substituted styrenes such as 2-methylstyrene, 4-methylstyrene, ethylstyrene, tert-butylstyrene, isopropylstyrene, and dimethylstyrene.

In addition to the monomers described above for the A blocks, these polymeric units can be prepared using up to 5 weight percent of the polar monomer such as methacrylic acid, methacrylamide, N-alkyl methacrylamide, N,N-dialkyl methacrylamide, or hydroxyalkyl methacrylate. These polar monomers can be used, for example, to adjust the cohesive strength of the A block and the glass transition temperature. Even with the addition of the polar monomer, however, the $T_g$ of each A block remains at least 50° C. Polar groups resulting from the polar monomers in the A block can function as reactive sites for chemical or ionic crosslinking, if desired. The A block polymeric units can be prepared using up to 4 weight percent, up to 3 weight percent, or up to 2 weight percent of the polar monomer. In many examples, however, the A block polymeric units are substantially free or free of a polar monomer. As used herein, the term "substantially free" in reference to the polar monomer means that any polar monomer that is present is an impurity in one of the selected monomers used to form the A block polymeric units. The amount of polar monomer is less than 1 weight percent, less than 0.5 weight percent, less than 0.2 weight percent, or less than 0.1 weight percent of the monomers in the reaction mixture used to form the A block polymeric units.

The A block polymeric units are often homopolymers. In some exemplary A blocks, the polymeric units are derived from an alkyl methacrylate monomers with the alkyl group having 1 to 6, 1 to 4, 1 to 3, 1 to 2, or 1 carbon atom. In some more specific examples, the A block polymeric units are derived from methyl methacrylate (i.e., the A blocks are poly (methyl methacrylate)).

The monoethylenically unsaturated monomers that are suitable for use in the B block polymeric unit usually have a $T_g$ no greater than 20° C. when reacted to form a homopolymer. In many examples, suitable monomers for the B block polymeric unit have a $T_g$ no greater than 10° C., no greater than 0° C., no greater than –5° C., or no greater than –10° C. when reacted to form a homopolymer. The $T_g$ of these homopolymers is often greater than or equal to –80° C., greater than or equal to –70° C., greater than or equal to –60° C., or greater than or equal to –50° C. The $T_g$ of these homopolymers can be, for example, in the range of –80° C. to 20° C., –70° C. to 10° C., –60° C. to 0° C., or –60° C. to –10° C. In addition to these monomers having a $T_g$ no greater than 20° C. when reacted to form a homopolymer, other monomers can be included in the B block provided the $T_g$ of the B block remains no greater than 20° C.

The B midblock polymeric unit is typically derived from (meth)acrylate monomers, vinyl ester monomers, or a combination thereof. That is, the B midblock polymeric unit is the reaction product of a second monomer selected from (meth) acrylate monomers, vinyl ester monomers, or mixtures thereof. As used herein, the term "(meth)acrylate" refers to both methacrylate and acrylate. As used herein to describe the monomers used to form the B midblock polymeric unit, the term "mixture thereof" means that more than one type of monomer (e.g., a (meth)acrylate and a vinyl ester) or more than one of the same type of monomer (e.g., two different (meth)acrylates) can be combined.

In many embodiments, acrylate monomers are reacted to form the B block. The acrylate monomers can be, for example, an alkyl acrylate or a heteroalkyl acrylate. The B blocks are often derived from acrylate monomers of Formula (II).

(II)

In Formula (II), $R^2$ is an alkyl with 1 to 22 carbons or a heteroalkyl with 2 to 20 carbons and 1 to 6 heteroatoms selected from oxygen or sulfur. The alkyl or heteroalkyl group can be linear, branched, cyclic, or a combination thereof.

Exemplary alkyl acrylates of Formula (II) that can be used to form the B block polymeric unit include, but are not limited to, ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, isooctyl acrylate, isononyl acrylate, decyl acrylate, isodecyl acrylate, lauryl acrylate, isotridecyl acrylate, octadecyl acrylate, and dodecyl acrylate.

Exemplary heteroalkyl acrylates of Formula (II) that can be used to form the B block polymeric unit include, but are not limited to, 2-methoxyethyl acrylate and 2-ethoxyethyl acrylate.

Some alkyl methacrylates can be used to prepare the B blocks such as alkyl methacrylates having an alkyl group with greater than 6 to 20 carbon atoms. Exemplary alkyl methacrylates include, but are not limited to, 2-ethylhexyl methacrylate, isooctyl methacrylate, n-octyl methacrylate, isodecyl methacrylate, and lauryl methacrylate. Likewise, some heteroalkyl methacrylates such as 2-ethoxy ethyl methacrylate can also be used.

Polymeric units suitable for the B block can be prepared from monomers according to Formula (II). (Meth)acrylate monomers that are commercially unavailable or that cannot be polymerized directly can be provided through an esterification or trans-esterification reaction. For example, a (meth)

acrylate that is commercially available can be hydrolyzed and then esterified with an alcohol to provide the (meth)acrylate of interest. This process may leave some residual acid in the B block. Alternatively, a higher alkyl (meth)acrylate can be derived from a lower alkyl (meth)acrylate by direct transesterification of the lower alkyl (meth)acrylate with a higher alkyl alcohol.

In still other embodiments, the B block polymeric unit is derived from vinyl ester monomers. Exemplary vinyl esters include, but are not limited to, vinyl acetate, vinyl 2-ethylhexanoate, and vinyl neodecanoate.

In addition to the monomers described above for the B block, this polymeric unit can be prepared using up to 5 weight percent of the polar monomer such as acrylic acid, acrylamide, N-alkyl acrylamide (e.g., N-methyl acrylamide), N,N-dialkyl acrylamide (N,N-dimethyl acrylamide), or hydroxyalkyl acrylate. These polar monomers can be used, for example, to adjust the glass transition temperature (i.e., the $T_g$ of the B block remains less than 20° C., however). Additionally, these polar monomers can result in polar groups within the polymeric units that can function as reactive sites for chemical or ionic crosslinking, if desired. The polymeric units can be prepared using up to 4 weight percent, up to 3 weight percent, up to 2 weight percent of the polar monomer. In many examples, however, the B block polymeric unit is substantially free or free of a polar monomer. As used herein, the term "substantially free" in reference to the polar monomer means that any polar monomer that is present is an impurity in one of the selected monomers used to form the B block polymeric unit. The amount of polar monomer is less than 1 weight percent, less than 0.5 weight percent, less than 0.2 weight percent, or less than 0.1 weight percent of the monomers used to form the B block polymeric units.

The B block polymeric unit is often a homopolymer. In some examples of the B block, the polymeric unit can be derived from an alkyl acrylate having an alkyl group with 1 to 22, 2 to 20, 3 to 20, 4 to 20, 4 to 18, 4 to 10, or 4 to 6 carbon atoms. Acrylate monomers such as alkyl acrylate monomers tend to be less rigid than their alkyl methacrylate counterparts.

In some adhesive compositions, the block copolymer is a (meth)acrylate block copolymer with the A block polymeric units derived from a methacrylate monomer and the B block polymeric unit derived from an acrylate monomer. For example, the A block polymeric units can be derived from an alkyl methacrylate monomer and the B block polymer unit can be derived from an alkyl acrylate monomer. In some more specific examples, the A blocks are derived from an alkyl methacrylate with an alkyl group having 1 to 6, 1 to 4, 1 to 3, or 1 to 2 carbon atoms and the B block is derived from an alkyl acrylate with an alkyl group having 3 to 20, 4 to 20, 4 to 18, 4 to 10, 4 to 6, or 4 carbon atoms. For example, the A blocks can be derived from methyl methacrylate and the B block can be derived from an alkyl acrylate with an alkyl group having 4 to 10, 4 to 6, or 4 carbon atoms. In an even more specific example, the A blocks can be derived from methyl methacrylate and the B blocks can be derived form n-butyl acrylate. That is, the A blocks are poly(methyl methacrylate) and the B block is poly(n-butyl acrylate).

The weight percent of the B block typically equals or exceeds the weight percent of the A blocks in the block copolymer. Higher amounts of the A block tend to increase the modulus of the block copolymer. If the amount of the A block is too high, however, the morphology of the block copolymer may be inverted from the desirable arrangement where the B block forms a continuous phase and the block copolymer is an elastomeric material. That is, if the amount of the A block is too high, the copolymer tends to have properties more similar to a thermoplastic material than to an elastomeric material. The block copolymer typically contains 10 to 50 weight percent of the A block polymeric units and 50 to 90 weight percent of the B block polymeric units. For example, the block copolymer can contain 10 to 40 weight percent of the A block polymeric units and 60 to 90 weight percent of the B block polymeric units, 10 to 35 weight percent of the A block polymeric units and 65 to 90 weight percent of the B block polymeric units, 15 to 50 weight percent of the A block polymeric units and 50 to 85 weight percent of the B block polymeric units, 15 to 35 weight percent of the A block polymeric units and 65 to 85 weight percent of the B block polymeric units, 10 to 30 weight percent of the A block polymeric units and 70 to 90 weight percent of the B block polymeric units, 15 to 30 weight percent of the A block polymeric units and 70 to 85 weight percent of the B block polymeric units, 15 to 25 weight percent of the A block polymeric units and 75 to 85 weight percent of the B block polymeric units, or 10 to 20 weight percent of the A block polymeric units and 80 to 90 weight percent of the B block polymeric units.

The block copolymers can have any suitable molecular weight. In many embodiments, the molecular weight of the block copolymer is at least 2,000 g/mole, at least 3,000 g/mole, at least 5,000 g/mole, at least 10,000 g/mole, at least 15,000 g/mole, at least 20,000 g/mole, at least 25,000 g/mole, at least 30,000 g/mole, at least 40,000 g/mole, or at least 50,000 g/mole. The molecular weight of the block copolymer is often no greater than 500,000 g/mole, no greater than 400,000 g/mole, no greater than 200,000 g/mole, no greater than 100,000 g/mole, no greater than 50,000 g/mole, or no greater than 30,000 g/mole. For example, the molecular weight of the block copolymer can be in the range of 1,000 to 500,000 g/mole, in the range of 3,000 to 500,000 g/mole, in the range of 5,000 to 100,000 g/mole, in the range of 5,000 to 50,000 g/mole, or in the range of 5,000 to 30,000 g/mole. The molecular weight is typically expressed as the weight average molecular weight.

Any known technique can be used to prepare the block copolymers. In some methods of preparing the block copolymers, iniferters are used as described in European Patent No. 0 349 232 B1 (Andrus et al.). However, for some applications, methods of preparing block copolymers that do not involve the use of iniferters may be preferred because iniferters tend to leave residues that can be problematic especially in photoinduced polymerization reactions. For example, the presence of thiocarbamate, which is a commonly used iniferter, may cause the resulting block copolymer to be more susceptible to weather-induced degradation. The weather-induced degradation may result from the relatively weak carbon-sulfur link in the thiocarbamate residue. The presence of thiocarbamate can often be detected, for example, using elemental analysis or mass spectroscopy. Thus, in some applications, it is desirable that the block copolymer is prepared using techniques that do not result in the formation of this weak carbon-sulfur link. That is, some block copolymers are prepared using synthesis methods that do not rely on the use of iniferters and the block copolymers are free of these weak carbon-sulfur bonds.

Some suitable methods of making the block copolymers are living polymerization methods. As used herein, the term "living polymerization" refers to polymerization techniques, process, or reactions in which propagating species do not undergo either termination or transfer. If additional monomer is added after 100 percent conversion, further polymerization can occur. The molecular weight of the living polymer increases linearly as a function of conversion because the number of propagating species does not change. Living polymerization methods include, for example, living free radical polymerization techniques and living anionic polymerization techniques. Specific examples of living free radical polymerization reactions include atom transfer polymerization reactions and reversible addition-fragmentation chain transfer polymerization reactions.

Block copolymers prepared using living polymerization methods tend to have well-controlled blocks. As used herein, the term "well-controlled" in reference to the method of making the blocks and the block copolymers means that the block polymeric units have at least one of the following characteristics: controlled molecular weight, low polydispersity, well-defined blocks, or blocks having high purity.

Some blocks and block copolymers have a well-controlled molecular weight that is close to the theoretical molecular weight. The theoretical molecular weight refers to the calculated molecular weight based on the molar charge of monomers and initiators used to form each block. Well-controlled blocks and block copolymers often have a weight average molecular weight ($M_w$) that is about 0.8 to 1.2 times the theoretical molecular weight or about 0.9 to 1.1 times the theoretical molecular weight. As such, the molecular weight of the blocks and of the total block can be selected and prepared.

Some blocks and block copolymers have low polydispersity. As used herein, the term "polydispersity" is a measure of the molecular weight distribution and refers to the weight average molecular weight ($M_w$) divided by the number average molecular weight ($M_n$) of the polymer. Materials with the same molecular weight have a polydispersity of 1.0 while materials with multiple molecular weights have a polydispersity greater than 1.0. The polydispersity can be determined, for example, using gel permeation chromatography. Well-controlled blocks and block copolymers often have a polydispersity of 2.0 or less, 1.5 or less, or 1.2 or less.

Some block copolymers have well-defined blocks. That is, the boundaries between the A blocks and the continuous phase containing the B blocks are well defined. These well-defined blocks have boundaries that are essentially free of tapered structures. As used herein, the term "tapered structure" refers to a structure derived from monomers used for both the A and B blocks. Tapered structures can increase mixing of the A block phase and the B block phase leading to decreased overall cohesive strength of the block copolymer or adhesive containing the block copolymer. Block copolymers made using methods such as living anionic polymerization tend to result in boundaries that are free or essentially free of tapered structures. The distinct boundaries between the A blocks and the B block often results in the formation of physical crosslinks that can increase overall cohesive strength without the need for chemical crosslinks. In contrast to these well-defined blocks, some block copolymers prepared using iniferters have less distinct blocks with tapered structures.

Some A blocks and B blocks have high purity. For example, the A blocks can be essentially free or free of segments derived from monomers used for the preparation of the B blocks. Similarly, B blocks can be essentially free or free of segments derived from monomers used for the preparation of the A blocks.

Living polymerization techniques typically lead to more stereoregular block structures than blocks prepared using non-living or pseudo-living polymerization techniques (e.g., polymerization reactions that use iniferters). Stereoregularity, as evidenced by highly syndiotactic structures or isotactic structures, tends to result in well-controlled block structures and tends to influence the glass transition temperature of the block. For example, syndiotactic poly(methyl methacrylate) (PMMA) synthesized using living polymerization techniques can have a glass transition temperature that is about 20° C. to about 25° C. higher than a comparable PMMA synthesized using conventional (i.e., non-living) polymerization techniques. Stereoregularity can be detected, for example, using nuclear magnetic resonance spectroscopy. Structures with greater than about 75 percent stereoregularity can often be obtained using living polymerization techniques.

When living polymerization techniques are used to form a block, the monomers are contacted with an initiator in the presence of an inert diluent. The inert diluent can facilitate heat transfer and mixing of the initiator with the monomers. Although any suitable inert diluent can be used, saturated hydrocarbons, aromatic hydrocarbons, ethers, esters, ketones, or a combination thereof are often selected. Exemplary diluents include, but are not limited to, saturated aliphatic and cycloaliphatic hydrocarbons such as hexane, octane, cyclohexane, and the like; aromatic hydrocarbons such as toluene; and aliphatic and cyclic ethers such as dimethyl ether, diethyl ether, tetrahydrofuran, and the like; esters such as ethyl acetate and butyl acetate; and ketones such as acetone, methyl ethyl ketone, and the like.

When the block copolymers are prepared using living anionic polymerization techniques, the simplified structure A-M can represent the living A block where M is an initiator fragment selected from a Group I metal such as lithium, sodium, or potassium. For example, the A block can be the polymerization reaction product of a first monomer composition that includes methacrylate monomers according to Formula (I). A second monomer composition that includes the monomers used to form the B block can be added to A-M resulting in the formation of the living diblock structure A-B-M. For example, the second monomer composition can include monomers according to Formula (II). The addition of another charge of the first monomer composition, which can include monomers according to Formula (I), and the subsequent elimination of the living anion site can result in the formation of triblock structure A-B-A. Alternatively, living diblock A-B-M structures can be coupled using difunctional or multifunctional coupling agents to form the triblock structure A-B-A copolymers or (A-B)$_n$— star block copolymers.

Any initiator known in the art for living anionic polymerization reactions can be used. Typical initiators include alkali metal hydrocarbons such as organo lithium compounds (e.g., ethyl lithium, n-propyl lithium, iso-propyl lithium, n-butyl lithium, sec-butyl lithium, tert-octyl lithium, n-decyl lithium, phenyl lithium, 2-naphthyl lithium, 4-butylphenyl lithium, 4-phenylbutyl lithium, cyclohexyl lithium, and the like). Such a monofunctional initiator can be useful in the preparation of living A blocks or living B blocks. For living anionic polymerization of (meth)acrylates, the reactivity of the anion can be tempered by the addition of complexing ligands selected from materials such as lithium chloride, crown ethers, or lithium ethoxylates.

Suitable difunctional initiators for living anionic polymerization reactions include, but are not limited to, 1,1,4,4-tetraphenyl-1,4-dilithiobutane; 1,1,4,4-tetraphenyl-1,4-dilithioisobutane; and naphthalene lithium, naphthalene sodium, naphthalene potassium, and homologues thereof. Other suitable difunctional initiators include dilithium compounds such as those prepared by an addition reaction of an alkyl lithium with a divinyl compound. For example, an alkyl lithium can be reacted with 1,3-bis(1-phenylethenyl)benzene or m-diisopropenylbenzene.

For living anionic polymerization reactions, it is usually advisable to add the initiator in small quantities (e.g., a drop at a time) to the monomers until the persistence of the characteristic color associated with the anion of the initiator is observed. Then, the calculated amount of the initiator can be added to produce a polymer of the desired molecular weight. The preliminary addition of small quantities often destroys contaminants that react with the initiator and allows better control of the polymerization reaction.

The polymerization temperature used depends on the monomers being polymerized and on the type of polymerization technique used. Generally, the reaction can be carried out at a temperature of about −100° C. to about 150° C. For living anionic polymerization reactions, the temperature is often about −80° C. to about 20° C. For living free radical polymerization reactions, the temperature is often about 20° C. to about 150° C. Living free radical polymerization reactions tend to be less sensitive to temperature variations than living anionic polymerization reactions.

Methods of preparing block copolymers using living anionic polymerization methods are further described, for example, in U.S. Pat. Nos. 6,734,256 B1 (Everaerts et al.), 7,084,209 B2 (Everaerts et al.), 6,806,320 B2 (Everaerts et al.), and 7,255,920 B2 (Everaerts et al.), incorporated herein by reference in their entirety. This polymerization method is further described, for example, in U.S. Pat. Nos. 6,630,554 B1 (Hamada et al.) and 6,984,114 B2 (Kato et al.) as well as in Japanese Patent Application Kokai Publication Nos. Hei 11-302617 (Uchiumi et al.) and 11-323072 (Uchiumi et al.)

In general, the polymerization reaction is carried out under controlled conditions so as to exclude substances that can destroy the initiator or living anion. Typically, the polymerization reaction is carried out in an inert atmosphere such as nitrogen, argon, helium, or combinations thereof. When the reaction is a living anionic polymerization, anhydrous conditions may be necessary.

Suitable block copolymers can be purchased from Kuraray Co., LTD. (Tokyo, Japan) under the trade designation LA POLYMER. Some of these block copolymers such as LA 2140, LA 2250, and LA 410 are triblock copolymers with poly(methyl methacrylate) endblocks and a poly(n-butyl acrylate) midblock.

In some embodiments, more than one block copolymer is included in the adhesive composition. For example, multiple block copolymers with different weight average molecular weights or multiple block copolymers with different concentrations of the A block polymeric units can be used. The use of multiple block copolymers with different weight average molecular weights or with different amounts of the A block polymeric units can, for example, improve the shear strength of the adhesive composition.

If multiple block copolymers with different weight average molecular weights are included in the adhesive composition, the weight average molecular weights can vary by any suitable amount. In some instances, the molecular weights of a first block copolymer can vary by at least 25 percent, at least 50 percent, at least 75 percent, at least 100 percent, at least 150 percent, or at least 200 percent from a second block copolymer having a larger weight average molecular weight. The block copolymer mixture can contain 10 to 90 weight percent of a first block copolymer and 10 to 90 weight percent of a second block copolymer having a larger weight average molecular weight, 20 to 80 weight percent of the first block copolymer and 20 to 80 weight percent of the second block copolymer having the larger weight average molecular weight, or 25 to 75 weight percent of the first block copolymer and 25 to 75 weight percent of the second block copolymer having the larger weight average molecular weight.

If multiple block copolymers with different concentrations of the A block polymeric units are included in the adhesive composition, the concentrations can differ by any suitable amount. In some instances, the concentration can vary by at least 20 percent, at least 40 percent, at least 60 percent, at least 80 percent, or at least 100 percent. The block copolymer mixture can contain 10 to 90 weight percent of a first block copolymer and 10 to 90 weight percent of a second block copolymer having a greater amount of the A block or 20 to 80 weight percent of the first block copolymer and 20 to 80 weight percent of the second block copolymer having the greater amount of the A block or 25 to 75 weight percent of the first block copolymer and 25 to 75 weight percent of the second block copolymer having the greater amount of the A block.

Tackifier Mixture

The adhesive compositions include a tackifier mixture in addition to the block copolymer. Adhesives compositions that contain higher levels of tackifiers often adhere better to certain substrates such as those having a non-polar surface or a low surface energy. Higher levels of tackifiers often increase the adhesion of the adhesive composition to a substrate such as a polyolefin. However, if the amount of certain tackifiers is exceeded, the adhesive composition often tends to become opaque rather than transparent. In many articles that contain the adhesive compositions, transparency of the adhesive composition is desirable. A tackifier mixture can be used to provide adhesive compositions with the desired transparency and adhesion.

The adhesive composition usually contains at least 30 weight percent of the block copolymer and at least 30 weight percent of the tackifier mixture based on a total weight of block copolymer and tackifier mixture in the adhesive composition. For example, the adhesive composition can contain 30 to 70 weight percent of the block copolymer and 30 to 70 weight percent of the tackifier mixture based on a total weight of the block copolymer and tackifier mixture in the adhesive composition. In other examples, the adhesive composition can contain 35 to 65 weight percent of the block copolymer and 35 to 65 weight percent of the tackifier mixture based on a total weight of the block copolymer and tackifier mixture in the adhesive composition. In still other examples, the adhesive composition can contain 40 to 60 weight percent of the block copolymer and 40 to 60 weight percent of the tackifier mixture based on a total weight of the block copolymer and tackifier mixture in the adhesive composition.

The tackifier mixture includes rosin acids, rosin esters, or mixtures thereof with varying degrees of unsaturation. Each of the rosin acids and rosin esters included in the tackifier mixture typically has three fused carbon rings and has zero, one, two, or three carbon-carbon double bonds.

Rosin acids having three carbon-carbon double bonds include those of Formula (III) or isomers of Formula (III).

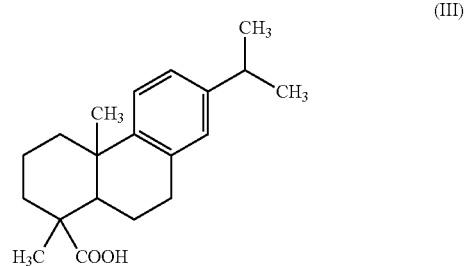 [SMILES: CC(C)c1ccc2c(c1)CCC1C(C)(C(=O)O)CCCC21C]

(III)

The rosin acid of Formula (III) is commonly called dehydroabietic acid.

Rosin acids having two carbon-carbon bonds include those of Formulas (IV) to (X) or isomers of Formulas (IV) to (X).

(IV)
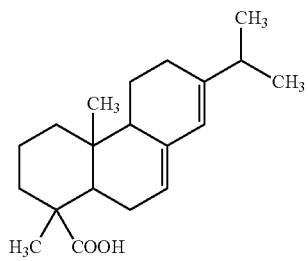

(V)
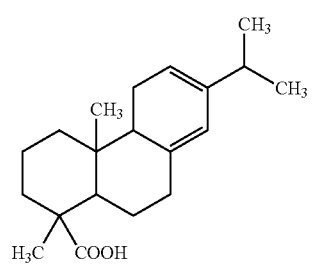

(VI)
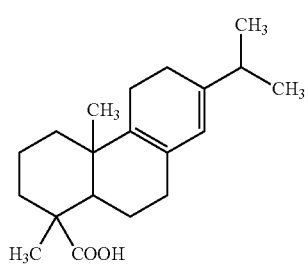

(VII)
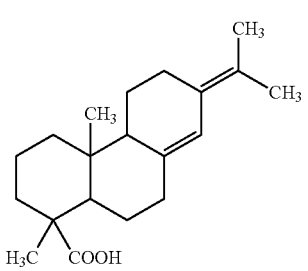

(VIII)
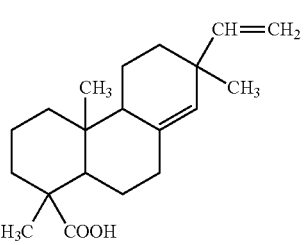

(IX)
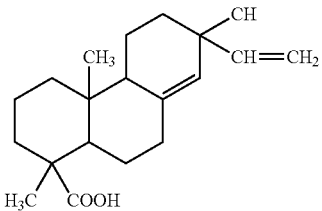

(X)
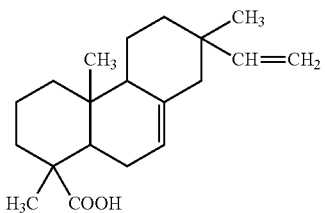

The rosin acid of Formula (IV) is commonly called abietic acid; the rosin acid of Formula (V) is commonly called levopimaric acid; the rosin acid of Formula (VI) is commonly called palustric acid; the rosin acid of Formula (VII) is commonly called neoabietic acid; the rosin acid of Formula (VIII) is commonly called pimaric acid; the rosin acid of Formula (IX) is commonly called sandaracopimaric acid; and the rosin acid of Formula (X) is commonly called isopimaric acid.

Rosin acids having one carbon-carbon double bond include hydrogenated (i.e., dihydro) versions of any of the rosin acids shown in FIGS. (IV) to (X). For example, the hydrogenation of a single carbon-carbon bond of Formula (IV) can lead to a rosin acid of Formula (XI) or isomers thereof.

(XI)
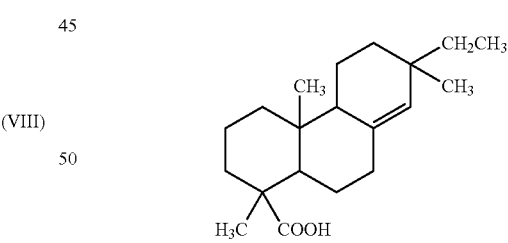

Likewise, the hydrogenation of a single carbon-carbon bond of Formula (VIII) can lead to a rosin acid of Formula (XII) or (XIII) or isomers thereof (XII)
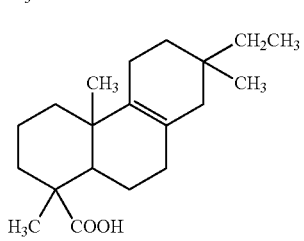

(XIII)

Hydrogenation of two of the double bonds of a rosin acid of Formula (III) with an aromatic ring can result in the formation of any of the following rosin acids of Formulas (XI), (XIV), or (XV).

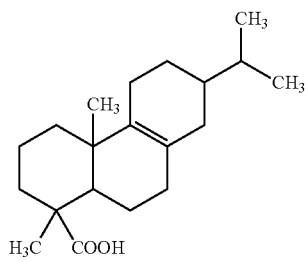

(XI)

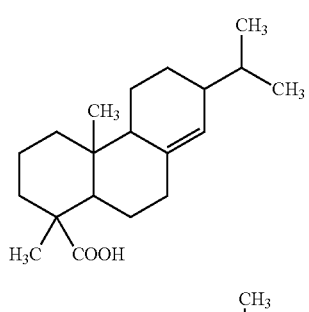

(XIV)

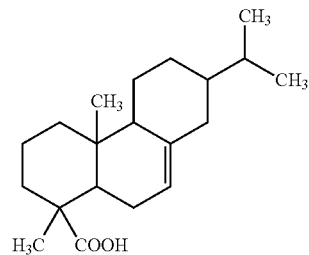

(XV)

Rosin acids having no carbon-carbon double bonds include a hydrogenated (i.e., tetrahydro) version of any of the rosin acids shown in Formulas (IV) to (X) or isomers thereof. For example, the hydrogenation of both carbon-carbon bonds of Formula (IV) can lead to a compound of Formula (XVI) or isomers thereof.

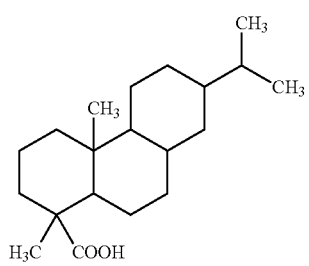

(XVI)

This same rosin acid results from the complete hydrogenation of the rosin acid of Formula (III). Likewise, the hydrogenation of both carbon-carbon bonds of Formula (VIII) can lead to a compound of Formula (XVII) or isomers thereof.

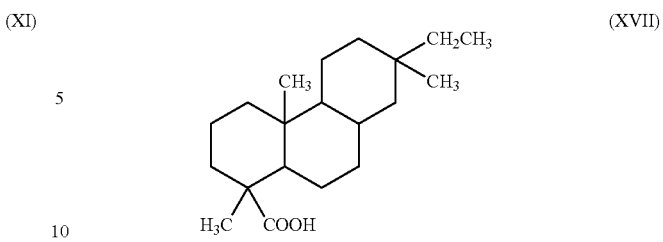

(XVII)

The corresponding rosin esters of any of these rosin acids are usually formed by reacting an alcohol or polyol with the rosin acid. Exemplary alcohols or polyols often have 1 to 20 carbon atoms and 1 to 5 hydroxyl groups. The alcohol or polyol can be saturated or unsaturated. The polyol is often an aliphatic polyol such as, an alkane substituted with multiple hydroxy groups. The polyol can be, for example, glycerol, ethylene glycol, diethylene glycol, or pentaerythritol. When polyols are used, the rosin acids can be reacted with all of the hydroxyl groups or any fraction of the hydroxyl groups on the polyol. For example, rosin esters formed using glycerol as the polyol can be a mono-ester, di-ester, or ternary-ester while rosin esters formed using pentaerythritol as the polyol can be a mono-ester, di-ester, ternary ester, or quaternary ester. A mono-ester is formed by reacting rosin acid with an alcohol or one hydroxyl group of a polyol. Di-esters, ternary esters, and quaternary esters can be formed by reacting rosin acid with two, three, or four hydroxy groups respectively of a polyol. A mixture of rosin esters can be present.

In one aspect, the adhesive composition includes at least three tackifiers that are each a rosin acid, rosin ester, or mixture thereof. Often, each tackifier is a mixture of rosin acids and/or rosin esters with differing degrees of saturation (i.e., differing degrees of unsaturation). The adhesive composition includes a first tackifier and a second tackifier that are solids at room temperature and a third tackifier that is a liquid at room temperature.

The two solid tackifiers in the adhesive compositions have a glass transition temperature that is equal to at least 20° C. These two tackifiers differ from each other in their degree of saturation. The first solid tackifier is more hydrogenated than the second solid tackifier. Stated differently, compared to the second solid tackifier, the first solid tackifier has a higher degree of saturation and a lower degree of unsaturation. Because of this difference in saturation or hydrogenation, the two solid tackifiers have a different solubility in the block copolymer and in the various polymeric units of the block copolymer. The first solid tackifier is less compatible or less miscible with the elastomeric region of the block copolymer than the second solid tackifier.

The first and second solid tackifiers can both contain a plurality of rosin acids, rosin esters, or mixtures thereof with zero, one, two, or three carbon-carbon double bonds. Each of the first and second solid tackifier can contain, for example, a mixture of rosin acids of Formulas (III) to (XVII) and/or isomers thereof and/or rosin esters thereof. The distribution of these rosin acids and/or rosin esters in the first solid tackifier and in the second solid tackifiers, however, is typically different. Compared to the second solid tackifier, the first solid tackifier typically contains a greater amount of a first rosin acid and/or first rosin ester having zero or one carbon-carbon double bonds. Compared to the first solid tackifier, the second solid tackifier typically contains a greater amount of a third rosin acid and/or third rosin ester having three carbon-carbon double bonds. Additionally, compared to the first solid tackifier, the second solid tackifier often, but not necessarily always, contains a greater amount of a second rosin acid and/or second rosin ester having two carbon-carbon double bonds. The first and second solid tackifiers differ most in the amount of third rosin acid and/or third rosin ester having three carbon-carbon double bonds and in the amount of the first rosin acid and/or first rosin ester having zero or one carbon-carbon double bond.

The first solid tackifier often contains more hydrogenated rosin acids and/or rosin esters than the second solid tackifier. Typically, at least 70 weight percent of the first solid tackifier is a first rosin acid and/or first rosin ester with zero or one carbon-carbon double bond. Stated differently, at least 70 weight percent of the first solid tackifier is a rosin acid corresponding to a hydrogenated counterpart of Formula (III) to (X) and/or a rosin ester and/or an isomer thereof. For example, at least 70 weight percent of the first solid tackifier can be a rosin acid of Formula (XI) to (XVII) and/or a rosin ester and/or an isomer thereof. Some exemplary first solid tackifiers contain at least 75 weight percent, at least 80 weight percent, or at least 85 percent of the first rosin acid and/or first rosin ester with zero or one carbon-carbon double bond.

In contrast, up to 50 weight percent of the second solid tackifier is a first rosin acid and/or first rosin ester with zero or one carbon-carbon double bonds. Stated differently, up to 50 weight percent of the second solid tackifier is a rosin acid corresponding to a hydrogenated counterpart of Formula (III) to (X) and/or a rosin ester and/or an isomer thereof. Some exemplary second solid tackifiers contain no greater than 45 weight percent, up to 40 weight percent, up to 35 weight percent, up to 30 weight percent, up to 25 weight percent, or up to 20 weight percent of the first rosin acid and/or first rosin ester with zero or one carbon-carbon double bonds.

The first solid tackifier often contains up to 20 weight percent of a second rosin acid and/or second rosin ester having two carbon-carbon double bonds. Some exemplary first solid tackifiers contain up to 18 weight percent, up to 16 weight percent, up to 15 weight percent, up to 14 weight percent, or up to 12 weight percent of the second rosin acid and/or second rosin ester having two carbon-carbon double bonds.

The second solid tackifier often contains at least 5 weight percent of a second rosin acid and/or second rosin ester having two carbon-carbon double bonds. For example, some second solid tackifiers have at least 10 weight percent, at least 15 weight percent, at least 20 weight percent, at least 25 weight percent, at least 30 weight percent, at least 35 weight percent, at least 40 weight percent, at least 45 weight percent, or at least 50 weight percent of the second rosin acid and/or second rosin ester having two carbon-carbon double bonds. When the amount of the second rosin acid and/or second rosin ester is relatively low such as less than 20 weight percent, there is a corresponding increase in the amount of the first rosin acid and/or first rosin ester having zero or one carbon-carbon bond.

Compared to the second solid tackifier, the first solid tackifier typically contains a smaller amount of a third rosin acid and/or third rosin ester having three carbon-carbon double bonds. The third rosin acid and/or third rosin ester is often dehydroabietic acid of Formula (III) and/or a rosin ester and/or an isomer thereof with all three carbon-carbon double bonds in the same six membered carbon ring. The first solid tackifier often contains up to 20 weight percent of the third rosin acid and/or third rosin ester having three carbon-carbon double bonds while the second solid tackifier often contain at least 25 weight percent of the third rosin acid and/or third rosin ester having three carbon-carbon double bonds. Some exemplary first solid tackifiers contain up to 18 weight percent, up to 16 weight percent, up to 15 weight percent, up to 14 weight percent, or up to 12 weight percent of the third rosin acid and/or third rosin ester having three carbon-carbon double bonds. In contrast, some exemplary second solid tackifiers contain at least 30 weight percent, at least 35 weight percent, at least 40 weight percent, or at least 45 weight percent of the third rosin acid and/or third rosin ester having three carbon-carbon double bonds.

Some exemplary first solid tackifiers contain at least 70 weight percent of the first rosin acid and/or first rosin ester having zero or one carbon-carbon double bond, up to 20 weight percent of second rosin acid and/or second rosin ester having two carbon-carbon double bonds, and up to 20 weight percent of a third rosin acid and/or first rosin ester having three carbon-carbon double bonds. Other exemplary first solid tackifier contain at least 70 weight percent of the first rosin acid and/or first rosin ester, up to 15 weight percent of the second rosin acid and/or second rosin ester, and up to 15 weight percent of the third rosin acid and/or third rosin ester. Still other exemplary first solid tackifiers contain at least 75 weight percent of the first rosin acid and/or first rosin ester, up to 12 weight percent of the second rosin acid and/or second rosin ester, and up to 12 weight percent of the third rosin acid and/or third rosin ester.

In some embodiments, the first solid tackifier contains 70 to 100 weight percent of the first rosin acid and/or first rosin ester having zero or one carbon-carbon double bond, 0 to 15 weight percent of the second rosin acid and/or second rosin ester having two carbon-carbon double bonds, and 0 to 15 weight percent of the third rosin acid and/or third rosin ester having three carbon-carbon double bonds. For example, the first solid tackifier can contain 70 to 98 weight percent of the first rosin acid and/or first rosin ester, 1 to 15 weight percent of the second rosin acid and/or second rosin ester, and 1 to 15 weight percent of the third rosin acid and/or third rosin ester. In another example, the first solid tackifier can contain 70 to 96 weight percent of the first rosin acid and/or first rosin ester, 1 to 15 weight percent of the second rosin acid and/or second rosin ester, and 3 to 15 weight percent of the third rosin acid and/or third rosin ester.

Some exemplary second solid tackifiers contain up to 50 weight percent of the first rosin acid and/or first rosin ester having zero or one carbon-carbon double bond, at least 5 weight percent of the second rosin acid and/or second rosin ester having two carbon-carbon double bonds, and at least 25 weight percent of a rosin acid and/or rosin ester having three carbon-carbon double bonds. Other exemplary second solid tackifiers contain up to 40 weight percent of the first rosin acid and/or first rosin ester, at least 5 weight percent of the second rosin acid and/or second rosin ester, and at least 30 weight percent of the third rosin acid and/or third rosin ester. The combined amount of the first rosin acid and/or first rosin ester plus the second rosin acid and/or second rosin ester is often at least 30 weight percent, at least 35 weight percent, at least 40 weight percent, at least 45 weight percent, or at least 50 weight percent.

In some embodiments, the second solid tackifier contains 0 to 50 weight percent of the first rosin acid and/or first rosin ester having zero or one carbon-carbon double bond, 5 to 70 weight percent of the second rosin acid and/or second rosin ester having two carbon-carbon double bonds, and 25 to 70 weight percent of the third rosin acid and/or third rosin ester having three carbon-carbon double bonds. For example, the second solid tackifier can contain 0 to 45 weight percent of the first rosin acid and/or first rosin ester, 5 to 70 weight percent of the second rosin acid and/or second rosin ester, and 25 to 60 weight percent of the third rosin acid and/or third rosin ester. Other exemplary second rosin acids and/or rosin esters thereof contain 0 to 20 weight percent of the first rosin acid and/or first rosin ester, 35 to 70 weight percent of the second rosin acid and/or second rosin ester, and 30 to 60 weight percent of the third rosin acid and/or third rosin ester. Still other exemplary second rosin acids and/or rosin esters thereof contain 20 to 50 weight percent of the first rosin acid and/or first rosin ester, 5 to 20 weight percent of the second rosin acid and/or second rosin ester, and 30 to 70 weight percent of the third rosin acid and/or third rosin ester.

Suitable first solid tackifiers include, but are not limited to, those commercially available under the trade designation FORAL from either Eastman Chemicals (Kingsport, Tenn.) or Hercules, Inc. (Wilmington, Del.). For example, FORAL 85, FORAL 85E, and FORAL 85LB (LB refers to low bromine) are glycerol esters of rosin acids. FORAL 105 and FORAL 105E are pentaerythritol esters of rosin acids. FORAL AX and FORAL AX-E are rosin acids.

Suitable second solid tackifiers include, for example, various glycerol esters of rosin acids that are commercially available under the trade designation SUPER ESTER from Arakawa Chemical, USA (Chicago, Ill.) and under the trade designation PERMALYN from Eastman Chemicals (Kingsport, Tenn.). Examples include, but are not limited to, SUPER ESTER W-100, SUPER ESTER A-75, SUPER ESTER KE-100, SUPER ESTER KE-300, and PERMALYN 5095-C. SUPER ESTER KE-100 and SUPER ESTER KE-300 are considered to be optically clear.

In addition to the first tackifier and the second tackifiers that are both solids at room temperature, the tackifier mixture includes a third tackifier that is a liquid or viscous fluid at room temperature or at temperatures near room temperature. This third liquid tackifier has a glass transition temperature that is no greater than 0° C. Like the first solid tackifier and the second solid tackifier, the third liquid tackifier is a rosin acid, rosin ester, or a mixture thereof. The third liquid tackifier can be a single rosin acid or single rosin ester. Alternatively, the third liquid tackifier can be a mixture of rosin acids and/or rosin esters.

In many embodiments, the third liquid tackifier contains a mixture of rosin acids and/or rosin esters with varying numbers of carbon-carbon double bonds. The same type of rosin acids and/or rosin esters that are present in the first solid tackifier and the second solid tackifier can be present in the third liquid tackifier. Compared to the first solid tackifier, the third liquid tackifier often contains a greater amount of a rosin acid and/or rosin ester having two carbon-carbon double bonds and a smaller amount of a rosin acid and/or rosin ester having zero or one carbon-carbon bond. Compared to the second solid tackifier, the third liquid tackifier often contains a smaller amount of a rosin acid and/or rosin ester having three carbon-carbon double bonds and a larger amount of a rosin acid and/or rosin ester having zero or one carbon-carbon double bond.

Some exemplary third liquid tackifiers contain at least 20 weight percent of a first rosin acid and/or first rosin ester having zero or one carbon-carbon double bond, at least 20 weight percent of a second rosin acid and/or second rosin ester having two carbon-carbon double bonds, and up to 20 weight percent of a third rosin acid and/or third rosin ester having three carbon-carbon double bonds. The amount of the first rosin acid and/or first rosin ester in the third liquid tackifier can be at least 25 weight percent, at least 30 weight percent, at least 35 weight percent, or at least 40 weight percent. The amount of the second rosin acid and/or second rosin ester in the third liquid tackifier can be at least 25 weight percent, at least 30 weight percent, at least 35 weight percent, or at least 40 weight percent. The amount of the third rosin acid and/or third rosin ester in the third liquid tackifier can be less than 18 weight percent, less than 15 weight percent, less than 12 weight percent, or less than 10 weight percent.

For example, the third liquid tackifier can contain 20 to 80 weight percent of the first rosin acid and/or first rosin ester having three carbon-carbon double bonds, 20 to 80 weight percent of the second rosin acid and/or second rosin ester having two carbon-carbon double bonds, and 0 to 20 weight percent of the third rosin acid and/or third rosin ester having three carbon-carbon double bonds. In other examples, the third liquid tackifier can contain 20 to 70 weight percent of the first rosin acid and/or first rosin ester, 20 to 70 weight percent of the second rosin acid and/or second rosin ester, and 0 to 15 weight percent of the third rosin acid and/or third rosin ester. In still other examples, the third liquid tackifier can contain 30 to 60 weight percent of the first rosin acid and/or first rosin ester, 30 to 60 weight percent of the second rosin acid and/or second rosin ester, and 1 to 15 weight percent of the third rosin acid and/or third rosin ester.

Examples of the third liquid tackifier include, but are not limited to, those commercially available under the trade designation STAYBELITE from Eastman Chemicals (Kingsport, Tenn.). Examples include STAYBELITE ESTER 3-E.

Of the three tackifiers typically included in the tackifier mixture, the first solid tackifier has the greatest amount of a rosin acid and/or rosin ester having zero or one carbon-carbon double bond. The first solid tackifier is typically predominately a rosin acid and/or rosin ester having zero or one carbon-carbon double bond. The second solid tackifier has the greatest amount of a rosin acid and/or rosin ester with three carbon-carbon double bonds. Often, the second solid tackifier is predominately a mixture of rosin acids and/or rosin esters thereof having two and three carbon-carbon double bonds. The third liquid tackifier is often predominately a mixture of rosin acids and/or rosin esters thereof having zero, one, or two carbon-carbon double bonds.

One of the major reasons for adding a tackifier is to increase the glass transition temperature of the B block polymeric unit of the block copolymer. When the tackifier is added, the $T_g$ of the B block typically increases and the modulus of the B block typically decreases. Lowering the modulus tends to make the B block softer. The first solid tackifier and the second solid tackifier are often comparable in their ability to increase the $T_g$ of the B block. However, if too much of the first solid tackifier is added, the adhesive composition can change from being clear to opaque. The opaqueness is an indication that the compatibility or solubility of the first solid tackifier in the block copolymer has been exceeded. Further addition of the first solid tackifier beyond the point where the adhesive composition becomes opaque does little to increase the glass transition temperature of the B block. That is, once of solubility of the first solid tackifier in the B block is exceeded, the glass transition temperature of the B block does not change significantly with further addition of the first solid tackifier.

Although any amount of the first solid tackifier can be used, the amount of the first solid tackifier is typically selected so that the solubility of the first solid tackifier in the block copolymer is not exceeded. The adhesive compositions often contain up to 25 weight percent or up to 20 weight percent of the first solid tackifier. The percent weight of the first solid tackifier in the adhesive composition is based on a total weight of the block copolymer and the tackifier mixture. For example, the adhesive composition can contain up to 18 weight percent, up to 15 weight percent, up to 12 weight percent, up to 10 weight percent, up to 8 weight percent, or up to 5 weight percent of the first solid tackifier. The amount of the first solid tackifier in the adhesive composition is at least 1 weight percent. For example, the adhesive composition can contain at least 2 weight percent, at least 5 weight percent, or at least 10 weight percent of the first solid tackifier. The concentration of the first solid tackifier in the adhesive composition is often in the range of 1 to 25 weight percent, 1 to 20 weight percent, 2 to 20 weight percent, 3 to 20 weight percent, 5 to 20 weight percent, or 5 to 15 weight percent.

The second solid tackifier can be added in larger amounts to the adhesive composition compared to the first solid tackifier without changing the clarity of the composition; however, the second solid tackifier is somewhat compatible with the A block polymeric units in addition to being miscible with the B block polymeric unit. Although the second solid tackifier can increase the $T_g$ of the B block and lower the plateau modulus of the block copolymer, the solubility of the second solid tackifier in the A blocks can result in diminished shear modulus and diminished cohesive strength for the adhesive composition at elevated temperatures. Thus, a mixture of the first and second solid tackifiers can be used to optimize the tackiness without adversely affecting the clarity and without adversely affecting the shear modulus and cohesive strength of the adhesive composition.

The amount of the second solid tackifier is usually selected to adjust the glass transition temperature of the B block and the plateau modulus of the block copolymer. The adhesive composition often contains up to 40 weight percent or up to 50 weight percent of the second solid tackifier. The percent weight of the second solid tackifier in the adhesive composition is based on a total weight of the block copolymer and the tackifier mixture. The adhesive composition can contain, for example, up to 35 weight percent, up to 30 weight percent, up to 25 weight percent, up to 20 weight percent, up to 15 weight percent, or up to 10 weight percent of the second solid tackifier. The adhesive composition often contains at least 1 weight percent, at least 2 weight percent, or at least 4 weight percent of the second solid tackifier. Some adhesive compositions contain at least 5 weight percent, at least 8 weight percent, at least 10 weight percent, at least 12 weight percent, or at least 15 weight percent of the second solid tackifier. The amount of the second solid tackifier is often in the range of 4 to 40 weight percent, 5 to 35 weight percent, 5 to 30 weight percent, 5 to 25 weight percent, or 5 to 20 weight percent.

The third liquid tackifier typically is added to lower the plateau modulus or the modulus at room temperature. A lower modulus at room temperature usually results in better wetting of the substrate by the adhesive composition. The adhesive composition can contain up to 50 weight percent of the third liquid tackifier. The percent weight of the third liquid tackifier in the adhesive composition is based on a total weight of the block copolymer and the tackifier mixture. The adhesive composition can contain, for example, up to 45 weight percent, up to 40 weight percent, up to 35 weight percent, up to 30 weight percent, or up to 25 weight percent of the third liquid tackifier. Some adhesive compositions contain at least 5 weight percent, at least 10 weight percent, at least 15 weight percent, at least 20 weight percent, at least 25 weight percent, or at least 30 weight percent of the third liquid tackifier. The amount of the third liquid tackifier is often in range of 1 to 50 weight percent, 5 to 50 weight percent, 10 to 50 weight percent, 10 to 40 weight percent, or 10 to 30 weight percent.

The tackifier mixture in the adhesive composition typically contains 1 to 45 weight percent of the first solid tackifier, 5 to 55 weight percent of the second solid tackifier, and 5 to 70 weight percent of the third liquid tackifier. For example, the tackifier mixture can include 5 to 45 weight percent of the first solid tackifier, 5 to 50 weight percent of the second tackifier, and 5 to 60 weight percent of the third liquid tackifier. In other examples, the tackifier mixture can include 5 to 40 weight percent of the first solid tackifier, 5 to 50 weight percent of the second solid tackifier, and 10 to 60 weight percent of the third liquid tackifier.

The adhesive composition often contains 30 to 70 weight percent of the (meth)acrylate block copolymer, 1 to 25 weight percent of the first solid tackifier, 1 to 50 weight percent of the second solid tackifier, and 1 to 50 weight percent of the third liquid tackifier. For example, the adhesive composition can contain 30 to 70 weight percent of the (meth)acrylate block copolymer, 1 to 20 weight percent of the first solid tackifier, 5 to 50 weight percent of the second solid tackifier, and 5 to 50 weight percent of the third liquid tackifier. In other examples, the adhesive composition contains 40 to 60 weight percent of the (meth)acrylate block copolymer, 1 to 20 weight percent of the first solid tackifier, 5 to 40 weight percent of the second solid tackifier, and 10 to 50 weight percent of the third liquid tackifier. The percent weight of the block copolymer and each of the tackifiers in the adhesive composition is based on a total weight of the block copolymer and the tackifier mixture.

In another aspect, an adhesive composition is provided that includes a (meth)acrylate block copolymer and a tackifier mixture of rosin acids, rosin esters, or a mixture thereof. The tackifier mixture includes 30 to 75 weight percent of a first rosin acid and/or a first rosin ester having zero or one carbon-carbon double bond, 10 to 40 weight percent of a second rosin acid and/or a second rosin ester having two carbon-carbon double bonds, and 10 to 50 weight percent of a third rosin acid and/or a third rosin ester having three carbon-carbon double bonds.

The tackifier mixture includes 30 to 75 weight percent weight percent of a first rosin acid and/or first rosin ester having zero or one carbon-carbon bond. For example, the tackifier mixture can contain 30 to 70 weight percent, 35 to 70 weight percent, 40 to 70 weight percent, 45 to 70 weight percent, 30 to 65 weight percent, 35 to 65 weight percent, 40 to 65 weight percent, 30 to 60 weight percent, 35 to 60 weight percent, or 40 to 60 weight percent of the first rosin acid and/or first rosin ester.

The tackifier mixture includes 10 to 40 weight percent of a second rosin acid and/or a second rosin ester having two carbon-carbon double bonds. For example, the tackifier mixture can contain 15 to 40 weight percent, 20 to 40 weight percent, 10 to 35 weight percent, 15 to 35 weight percent, or 20 to 35 weight percent of the second rosin acid and/or second rosin ester.

The tackifier mixture includes 10 to 50 weight percent of a third rosin acid and/or a third rosin ester having three carbon-carbon double bonds. For example, the tackifier mixture can contain 15 to 50 weight percent, 20 to 50 weight percent, 10 to 45 weight percent, 15 to 45 weight percent, 20 to 45 weight percent, 10 to 40 weight percent, 15 to 40 weight percent, 20 to 40 weight percent, 10 to 35 weight percent, 15 to 35 weight percent, or 20 to 35 weight percent of the third rosin acid and/or rosin ester.

The adhesive composition that contains 30 to 70 weight percent of the (meth)acrylate block copolymer often includes 10 to 50 weight percent of the first rosin acid and/or first rosin ester having zero or one carbon-carbon bond. For example, the adhesive composition can contain 15 to 50 weight percent, 15 to 45 weight percent, 15 to 40 weight percent, 15 to 35 weight percent, 20 to 45 weight percent, 20 to 40 weight percent of the first rosin acid and/or first rosin ester. The percent weight of the block copolymer and any rosin acid and/or rosin ester in the adhesive composition is based on a total weight of the block copolymer and the tackifier mixture.

The adhesive composition that contains 30 to 70 weight percent of the (meth)acrylate block copolymer often includes 3 to 30 weight percent of the second rosin acid and/or second rosin ester having two carbon-carbon double bonds. For example, the adhesive composition can contain 4 to 30 weight percent, 4 to 25 weight percent, 5 to 30 weight percent, 5 to 25 weight percent, or 5 to 20 weight percent of the second rosin acid and/or second rosin ester. The percent weight of the block copolymer and any rosin acid and/or rosin ester in the adhesive composition is based on a total weight of the block copolymer and the tackifier mixture.

The adhesive composition that contains 30 to 70 weight percent of the (meth)acrylate block copolymer often includes 3 to 35 weight percent of the third rosin acid and/or third rosin ester having three carbon-carbon double bonds. For example, the adhesive composition can contain 3 to 30 weight percent, 3 to 25 weight percent, 4 to 35 weight percent, 4 to 30 weight percent, 4 to 25 weight percent, 5 to 35 weight percent, 5 to 30 weight percent, or 5 to 25 weight percent of the third rosin acid and/or third rosin ester. The percent weight of the block copolymer and any rosin acid and/or rosin ester in the adhesive composition is based on a total weight of the block copolymer and the tackifier mixture.

The adhesive compositions can include, for example, 30 to 70 weight percent of the (meth)acrylate block copolymer, 10 to 50 weight percent of a first rosin acid and/or first rosin ester having zero or one carbon-carbon bond, 3 to 30 weight percent of the second rosin acid and/or second rosin ester having two carbon-carbon double bonds, and 3 to 35 weight percent of a third rosin acid and/or a third rosin ester having three carbon-carbon double bonds. Some exemplary adhesive compositions contain 30 to 70 weight percent of the (meth)acrylate block copolymer, 15 to 50 weight percent of the first rosin acid and/or first rosin ester, 5 to 25 weight percent of the second rosin acid and/or rosin ester, and 3 to 30 weight percent of a third rosin acid and/or third rosin ester. The percent weight of the block copolymer and any rosin acid and/or rosin ester in the adhesive composition is based on a total weight of the block copolymer and the tackifier mixture.

Other Components of Adhesive Composition

The adhesive composition can optionally include a solvent. Such an adhesive composition can be applied to a substrate using a coating method. Once the coating has been formed, the solvent can be removed. Examples of suitable solvents include, but are not limited to, ethyl acetate, tetrahydrofuran, methyl ethyl ketone, and toluene. The solvent can be present in any amount needed, for example, to coat the adhesive composition. In some applications, the solvent is present in an amount up to 40 weight percent of the adhesive composition. For example, up to 35 weight percent, up to 30 weight percent, up to 25 weight percent, up to 20 weight percent, up to 15 weight percent, up to 10 weight percent, up to 5 weight percent, up to 4 weight percent, up to 3 weight percent, up to 2 weight percent, or up to 1 weight percent of the adhesive composition can be a solvent.

Various plasticizers can be added to the adhesive compositions. Exemplary plasticizers include, but are not limited to, hydrocarbon oils (e.g., oils that are aromatic or paraffinic), phthalates, polyalkylene oxides such as polyethylene oxide and polypropylene oxide, phosphate esters, aliphatic carboxylate esters, and benzoate esters. The plasticizer can be added in any desired amount but is often up to 20 weight percent of the adhesive composition.

Fillers can be added. Fillers typically can alter the storage modulus of the adhesive composition. If transparency is desired, fillers are often chosen that have a relatively small particle size such as, for example, less than 1 micrometer (1000 nanometers). The filler can be used in any desired amount but is often up to 20 weight percent of the adhesive composition.

Various other polymeric materials can be added to the adhesive composition. For example, diblock copolymers can be added in addition to the block copolymer described above that is often a triblock or starblock copolymer. Typically, the diblock copolymer includes a hard polymeric unit and a soft polymeric unit. The hard polymeric unit of the diblock copolymer is often selected to be compatible with or miscible with A block endblocks of the triblock or starblock copolymer. Likewise, the soft polymeric unit of the diblock is often selected to be compatible with or miscible with the B midblock of the triblock or starblock copolymer.

A triblock or starblock copolymer having A blocks derived from an alkyl methacrylate such as methyl methacrylate and a B block derived from an alkyl acrylate such as n-butyl acrylate can be mixed with a diblock having an A block derived from an alkyl methacrylate such as methyl methacrylate and a B block derived from an alkyl acrylate such an n-butyl acrylate. Up to 50 weight percent of the diblock can be the hard polymeric unit. For example, some diblocks have up to 40 weight percent, up to 30 weight percent, up to 20 weight percent, or up to 10 weight percent hard polymeric unit with the remainder of the diblock being the soft polymeric unit.

The addition of the diblock copolymer can often further increases the tackiness of the adhesive composition. The diblock copolymer can be added in any desired amount but is often added in an amount up to 50 weight percent based on a total weight of the diblock copolymer and the triblock or starblock copolymer. For example, the amount of the diblock can be up to 40 weight percent, up to 30 weight percent, up to 25 weight percent, up to 20 weight percent, or up to 15 weight percent based on the total weight of the diblock copolymer and the triblock or starblock copolymer.

Other optional additives include, for example, stabilizers such as antioxidants and UV stabilizers, pigments, and radiation crosslinkers.

Articles and Methods of Making Articles

Articles are provided that include the adhesive composition. The adhesive composition, which is the same as described above, is typically adhered to a substrate. In most embodiments, the adhesive composition is a pressure sensitive adhesive. As used herein, the term "pressure sensitive adhesive" refers to an adhesive that exhibits aggressive and persistent tack, adhesion to a substrate with no more than finger pressure, and sufficient cohesive strength to be removed cleanly from the substrate.

Any suitable substrate can be used. Some suitable substrates include paper, fabric, polymeric materials, glass materials, ceramic materials, metal-containing materials such as metals or metal oxides, or a combination thereof. The substrate can have any suitable thickness and surface texture. The substrate can be flexible or rigid. The substrate can include a single layer or multiple layers such as a support layer, primer layer, hard coat layer, decorative layer, or the like. The substrate can be visibly clear, colored but transmissive, or opaque (i.e., not transmissive).

Examples of polymeric materials that can be used as substrates include, but is not limited to, polyvinyl chlorides, polyesters (e.g., polyethylene terephthalate), polyolefins, poly(meth)acrylates, polyurethanes, polycarbonates, fluorinated polymers such as those having perfluoro groups, polyethylene vinyl acetate, cellulose acetate, ethyl cellulose, or the like. Exemplary polyolefins include polyethylene (e.g., high density polyethylene) and polypropylene (e.g., high density polypropylene). Some polymeric materials have a metallized surface such as metallized polymeric films. Other polymeric materials have an outer layer that forms a release surface (e.g., the release surface can contain a silicone material). The polymeric material substrates can be in any suitable form such as, for example, a sheet or foam. Some exemplary foam substrates contain polyolefins (e.g., polyethylene), polyurethanes, poly(meth)acrylates, or neoprene.

Examples of fabrics that can be used as substrates include woven fabrics as well as non-woven fabrics. These fabrics can be prepared using threads that are natural (e.g., cotton, wool, or silk) or synthetic (e.g., nylon, polyester, or rayon). The fabrics can also be prepared from ceramic materials or glass.

Some substrates include metals. Some exemplary metal substrates are films that contain aluminum or copper.

The articles can include two substrates with the adhesive composition positioned between two substrates. For example, an adhesive film that includes an adhesive composition adhered to a first substrate can be attached to a second substrate such that the adhesive composition is positioned between the first substrate and the second substrate. Although any suitable second substrate can be used, the second substrate in some applications is a low surface energy substrate such as one that includes a polyolefin.

For example, the adhesive composition can be adhered to one major surface of a first substrate and the opposite major surface of the first substrate can have a graphic design or label. A layer of the adhesive composition can be positioned between the first substrate and a release liner. Upon removal of the release liner, the adhesive composition can be adhered to a second substrate. For example, the second substrate can be a low surface energy substrate such as one that contains a polyolefin.

Some more specific articles are transfer tapes. The transfer tape can include an adhesive layer positioned between two release liners or can include an adhesive layer positioned adjacent to a single release liner. Other specific articles are single sided tapes in which the substrate (e.g., the backing or carrier) is positioned adjacent to a single adhesive layer. Still other specific articles are double sided tapes in which the substrate (e.g., backing or carrier) is positioned between two adhesive layers. The substrate of the single side tape or the double sided tape can be, for example, a film, nonwoven fabric, woven fabric, or foam.

In many articles, the adhesive composition is optically clear. As used herein, the term "optically clear" refers to an adhesive composition in the form of a film having a thickness of approximately 2 mils (0.05 millimeters) with a luminous transmission of at least 90 percent, a haze of less than about 2 percent, and opacity less than about 1 percent in the 400 to 700 nanometer wavelength range. Both luminous transmission and haze can be determined using, for example, ASTM-D 1003-95. The optically clear adhesive composition often is visually free of bubbles. Although optical clarity is measures when the adhesive composition is in the form of a film, an optically clear adhesive composition does not need to be in the form of a film.

The optical clarity of the adhesive composition can depend on the size of the A block domains. The A block domains often have an average size that is less than 200 nanometers, less than 150 nanometers, or less than 100 nanometers. The size of the A block domains can be altered, for example, by changing the amount of the A block or by changing the monomeric composition used to form the A blocks in the block copolymer. Unless the refractive indexes of both the A blocks and the B blocks are well matched, larger A block domain sizes tend to cause light scattering.

The articles including a substrate and an adhesive layer adhered to the substrate can be prepared, for example, using a coating technique. When a coating technique is used, the adhesive composition often includes a solvent. Suitable coating methods include, but are not limited to, knife coating, die coating, spray coating, and the like. The substrate is often a flexible backing that can be delivered for coating from a roll. After coating, the solvent can be removed by evaporation or drying.

Alternatively, the articles including a substrate and an adhesive layer adhered to the substrate can be prepared by applying the adhesive composition to the substrate using a hot melt process. The adhesive composition can be applied, for example, by spraying or melt-extruding.

EXAMPLES

These examples are merely for illustrative purposes and are not meant to be limiting on the scope of the appended claims. All parts, percentages, ratios, and the like in the examples and the rest of the specification are by weight, unless noted otherwise. Solvents and other reagents used were obtained from Sigma-Aldrich Chemical Company (Milwaukee, Wis.) unless otherwise noted.

TABLE 1

Glossary of Materials

| Material | Description |
| --- | --- |
| LA POLYMER 2140 | A poly(methyl methacrylate)-poly(n-butyl acrylate)-poly(methyl methacrylate) triblock copolymer that is available from Kuraray Co., LTD (Tokyo, Japan) with a weight average molecular weight of about 80,000 grams/mole. This copolymer contains 24 weight percent poly(methyl methacrylate) and 76 weight percent poly(n-butyl acrylate). |
| LA POLYMER 2250 | A poly(methyl methacrylate)-poly(n-butyl acrylate)-poly(methyl methacrylate) triblock copolymer that is available from Kuraray Co., LTD (Tokyo, Japan) with a weight average molecular weight of about 80,000 grams/mole. This copolymer contains 33 weight percent poly(methyl methacrylate) and 67 weight percent poly(n-butyl acrylate). |
| LA POLYMER 410 | A poly(methyl methacrylate)-poly(n-butyl acrylate)-poly(methyl methacrylate) triblock copolymer that is available from Kuraray Co., LTD (Tokyo, Japan) with a weight average molecular weight of about 160,000 grams/mole. This copolymer contains 21 weight percent poly(methyl methacrylate) and 79 weight percent poly(n-butyl acrylate). |
| FORAL 85 | Glycerol ester of rosin acids that is a solid at room temperature and that is commercially available from Hercules, Inc. (Wilmington, DE). |
| FORAL 85E | Glycerol ester of rosin acids that is a solid at room temperature and that is commercially available from Eastman Chemicals (Kingsport, TN). |
| FORAL 105 | Pentaerythritol ester of rosin acids that is a solid at room temperature and that is commercially available from Hercules, Inc. (Wilmington, DE). |
| FORAL 105E | Pentaerythritol ester of rosin acids that is solid at room temperature and that is commercially available from Eastman Chemicals (Kingsport, TN). |
| FORAL AX | A rosin acid that is a solid at room temperature and that is commercially available from Hercules, Inc. (Wilmington, DE). |
| FORAL AX-E | A rosin acid that is a solid at room temperature and that is commercially available from Eastman Chemicals (Kingsport, TN). |

TABLE 1-continued

Glossary of Materials

| Material | Description |
|---|---|
| SUPER ESTER A-75 | Glycerol ester of rosin acids that is a solid at room temperature and that is commercially available from Arakawa Chemical USA (Chicago, IL). |
| SUPER ESTER W-100 | Glycerol ester of rosin acids that is a solid at room temperature and that is commercially available from Arakawa Chemical US (Chicago, IL). |
| ESTER GUM 8D/M | Glycerol ester of rosin acids that is a solid at room temperature and that is commercially available from Eastman Chemicals (Kingsport, TN). |
| PERMALYN 5095-C | Glycerol ester of rosin acids that is a solid at room temperature and that is commercially available from Eastman Chemicals (Kingsport, TN). |
| STAYBELITE ESTER 3-E | An ester of hydrogenated rosin acids that is a liquid at room temperature and that is available from Eastman Chemicals (Kingsport, TN). |
| Polyester film | Polyester film having a thickness of about 50 micrometers that is commercially available under the trade designation HOSTAPHAN 3SAB from Mitsubishi Polyester Film (Greer, SC). |
| Silicone release liner | CLEARSIL release coating on single side of a polyester terephthalate backing that was obtained from CP Films Inc., (Martinsville, VA). |

Test Methods

180 Degree Peel Strength

Adhesive tape samples (i.e., an adhesive compositions coated on polymeric backings) were analyzed using an IMASS Slip/Peel tester available from Imass, Inc. (Accord, Mass.). A 1.27 centimeter wide strip of the adhesive tape was applied to the horizontal surface of a clean polypropylene test plate that was clamped to the peel tester. The adhesive was positioned between the polypropylene test plate and the polymeric backing Firm contact between the adhesive and the polypropylene test plate was accomplished by pressing on the polymeric backing with one pass of a 2-kilogram hard rubber roller. The free end of the strip was attached to the peel tester scale. The strip was removed at a constant rate of 30.5 centimeters/minute (12 inches/minute). The peel adhesion force was measured in ounces and is expressed in Newtons/decimeter (N/dm). The data reported in Table 2 is the average of multiple tests. If the tape showed an irregular response (i.e., jerky) it was reported as a shocky peel.

90 Degree Peel Strength of Acrylic Foam Tapes

Foam tape samples were evaluated by measuring their peel adhesion to various surfaces. The foam tapes were prepared as described in Example 14. A strip of foam tape measuring 1.25 cm wide×12.7 cm long was applied to a polypropylene (PP), a high density polyethylene (HDPE), or a stainless steel (SS) test panel, and a 0.13-mm thick anodized aluminum foil was laminated to the exposed adhesive layer. The aluminum foil was larger in size than the foam tape so that there was a portion of the aluminum foil that was not laminated to the adhesive layer. The assembly was then rolled down using four passes of a 6.8-kilogram steel roller at a rate of 61 centimeters/minute (24 inches/minute) and allowed to dwell for 24 hours at room temperature (about 22° C.). The foam tape was peeled from the test panel by pulling the aluminum strip at an angle of 90 degrees in an Instron Model 4465 tensile tester (available from Instron Corporation, Norwood, Mass.) at a crosshead rate of 30.5 centimeters/minute (12 inches/minute). The average peel adhesion force required to remove the foam tape from the panel was measured in pounds and is expressed in Newtons/decimeter (N/dm).

Gel Permeation Chromatography Analysis

The weight average molecular weight of the block copolymers were determined using gel permeation chromatography (GPC). A 10.0 mL aliquot of tetrahydrofuran was added to approximately 25.0 mgs of each sample. The block copolymers dissolved in the tetrahydrofuran overnight. After dissolution, the samples were filtered with a 0.25 micron Teflon syringe filter.

The GPC instrument (Model 2695 Separations Module) was obtained from Waters Corporation (Milford, Mass.) with a PL-gel Mixed B column from Polymer Labs of Varian, Inc. (Amherst, Mass.). The eluent was tetrahydrofuran, the injection volume was 100 microliters, the temperature was 35° C., and the detector was a Model 100 Dual detector (refractive index portion) from Viscoteck Corporation (Houston, Tex.). The molecular weight calculations were based upon a calibration curve prepared using narrow dispersity polystyrene standards ranging in molecular weight from 7.50E+06 grams per mole down to 580 grams per mole. The actual calculations were completed with Cirrus GPC software from Polymer Labs.

Dynamic Mechanical Analysis

The adhesive compositions were tested by Dynamic Mechanical Analysis (DMA) in a parallel plate rheometer that is commercially available as Model A2000 from TA Instruments (New Castle, Del.). The samples were heated from −50° C. to 150° C. at a rate of 2° C. per minute with a frequency of 1 radian/second and a maximum strain of 1 percent. The storage modulus (G') values as a function of temperature was recorded.

Nuclear Magnetic Resonance Analysis

The tackifiers were analyzed by Proton 1H Nuclear Magnetic Resonance (NMR) spectroscopy on a Varian INOVA 400 NMR Spectrometer. The tackifiers were dissolved in chloroform.

TABLE 2

NMR Analysis of Various Tackifiers

| Tackifier | Rosin acid and/or ester thereof having three C=C bonds, (wt %) | Rosin acid and/or ester thereof having two C=C bonds, (wt %) | Rosin acid and/or ester thereof having zero or one C=C bond, (wt %) |
|---|---|---|---|
| FORAL 85E | 6.3 | 3.1 | 90.5 |
| FORAL 105E | 8.1 | 9.8 | 82 |
| FORAL 85 | 9.8 | 2.5 | 87.6 |
| FORAL 105 | 11.4 | 9.9 | 78.6 |
| FORAL AX | 10.7 | 8.5 | 80.8 |
| FORAL AX-E | 6.7 | 8.9 | 84.4 |
| SUPER ESTER W-100 | 33.7 | 46.5 | 19.9 |
| SUPER ESTER A-75 | 52.8 | 9.8 | 37.4 |
| ESTER GUM 8D/M | 41.0 | 58.9 | 0.1 |
| PERMALYN 5059-C | 45.1 | 43.7 | 11.2 |
| STAYBELITE Ester 3M | 8.3 | 42.7 | 49.1 |

Differential Scanning Calorimetry (DSC) Analysis

The glass transition temperatures of various tackifiers were measured using a differential scanning calorimeter (Model Q200) that is commercially available from TA Instruments (New Castle, Del.). The samples were heated by increasing the temperature at a rate of 10° C. per minute. The glass transition temperature was characterized as the midpoint of the inflection in the heat flow versus temperature curve.

TABLE 3

Differential Scanning Calorimetry Analysis of Various Tackifiers

| Tackifier | Glass Transition Temperature, ° C. |
|---|---|
| FORAL 85E | 38 |
| FORAL 85 | 38 |
| FORAL 105E | 53 |
| FORAL 105 | 53 |
| SUPER ESTER A-75 | 34 |
| STAYBELITE ESTER 3-E | −19 |

Compatibility of Tackifier with Triblock Copolymers

The compatibility of various tackifiers with the triblock copolymer was determined by preparing various compositions with different ratios of tackifier to triblock copolymer as shown below in Table 4. Films were cast from the compositions. Transparent films indicate that the tackifier is soluble in the triblock copolymer. Opaque films indicate that the solubility of the triblock copolymer for the tackifier has been exceeded.

Various compositions were prepared that contained 55 weight percent solids in toluene. The triblock copolymer used was LA POLYMER 410. The compositions were cast as thick films with the solvent being removed by evaporation. The amount of the triblock polymer (weight percent), the tackifier, and the amount of the tackifier (weight percent) are shown in Table 4 for the resulting films. The opacity or transparency of the resulting film was recorded.

TABLE 4

Visual Compatibility of Tackifier with Triblock Copolymer

| Block copolymer (Weight percent) | Tackifer | Tackifier (Weight percent) | Clarity |
|---|---|---|---|
| 90 | FORAL 85 | 10 | Transparent |
| 75 | FORAL 85 | 25 | Opaque |
| 60 | FORAL 85 | 40 | Opaque |
| 90 | SUPER ESTER A-75 | 10 | Transparent |
| 75 | SUPER ESTER A-75 | 25 | Transparent |
| 60 | SUPER ESTER A-75 | 40 | Transparent |

Various adhesive compositions were prepared that contained 55 weight percent solids in toluene. The triblock copolymer, which was LA POLYMER 410, was mixed with various tackifiers as shown in Table 5. Each adhesive composition contained 60 weight percent triblock copolymer and 60 weight percent tackifier based on the total weight of the adhesive composition. The adhesive compositions were knife coated on a 50 micrometer (2 mil) thick polyester film and dried in an oven at 90° C. for 15 minutes to give a dry adhesive coating thickness of approximately 50 micrometers (2 mils). Haze measurements were made using the BYK Gardner Haze meter.

TABLE 5

Haze of Various Adhesive Compositions

| Tackifer | Haze |
|---|---|
| ESTERGUM 8D/M | 1.96 |
| PERMALYN 5095C | 2.02 |
| STAYBELITE ESTER 3E | 2.23 |
| SUPER ESTER W-100 | 2.26 |
| SUPER ESTER W-115 | 2.62 |
| FORAL AX | 4.22 |
| FORAL AX-E | 4.86 |
| FORAL 85 | 5.49 |
| FORAL 85-LB | 7.63 |

Example 1

An adhesive composition was prepared that contained 62 weight percent solids in toluene. The solids contained 40 weight percent LA POLYMER 2140 triblock copolymer, weight percent FORAL 85 solid tackifier, 35 weight percent SUPER ESTER A-75 solid tackifier, and 20 weight percent STAYBELITE ESTER 3-E liquid tackifier. This adhesive composition was knife coated on a 50 micrometer (2 mil) thick polyester film and dried in an oven at 90° C. for 15 minutes to give a dry adhesive coating thickness of approximately 27-30 micrometers (1.1-1.2 mils). The 180 degree peel test data for this example is in Table 6. The content of the tackifier mixture and adhesive compositions are in Tables 7 to 9.

Example 2

An adhesive composition was prepared that contained 62 weight percent solids in toluene. The solids contained 40 weight percent LA POLYMER 2140 triblock copolymer, 10 weight percent FORAL 85 solid tackifier, 30 weight percent SUPER ESTER A-75 solid tackifier, and 20 weight percent STAYBELITE ESTER 3-E liquid tackifier. This adhesive composition was knife coated on a 50 micrometer (2 mil) thick polyester film and dried in an oven at 90° C. for 15 minutes to give a dry adhesive coating thickness of approximately 27-30 micrometers (1.1-1.2 mils). The 180 degree peel test data for this example is in Table 6. The content of the tackifier mixture and adhesive compositions are in Tables 7 to 9.

Example 3

An adhesive composition was prepared that contained 62 weight percent solids in toluene. The solids contained 40 weight percent LA POLYMER 2140 triblock copolymer, 30 weight percent FORAL 85 solid tackifier, 10 weight percent SUPER ESTER A-75 solid tackifier, and 20 weight percent STAYBELITE ESTER 3-E liquid tackifier. This adhesive composition was knife coated on a 50 micrometer (2 mil) thick polyester film and dried in an oven at 90° C. for 15 minutes to give a dry adhesive coating thickness of approximately 27-30 micrometers (1.1-1.2 mils). The 180 degree peel test data for this example is in Table 6. The content of the tackifier mixture and adhesive compositions are in Tables 7 to 9.

Example 4

An adhesive composition was prepared that contained 62 weight percent solids in toluene. The solids contained 50 weight percent LA POLYMER 2140 triblock copolymer, weight percent FORAL 85 solid tackifier, 25 weight percent SUPER ESTER A-75 solid tackifier, and 20 weight percent STAYBELITE ESTER 3-E liquid tackifier. This adhesive composition was knife coated on a 50 micrometer (2 mil) thick polyester film and dried in an oven at 90° C. for 15 minutes to give a dry adhesive coating thickness of approximately 27-30 micrometers (1.1-1.2 mils). The 180 degree peel test data for this example is in Table 6. The content of the tackifier mixture and adhesive compositions are in Tables 7 to 9.

Example 5

An adhesive composition was prepared that contained 62 weight percent solids in toluene. The solids contained 50 weight percent LA POLYMER 2140 triblock copolymer, 10 weight percent FORAL 85 solid tackifier, 20 weight percent SUPER ESTER A-75 solid tackifier, and 20 weight percent STAYBELITE ESTER 3-E liquid tackifier. This adhesive composition was knife coated on a 50 micrometer (2 mil) thick polyester film and dried in an oven at 90° C. for 15 minutes to give a dry adhesive coating thickness of approximately 27-30 micrometers (1.1-1.2 mils). The 180 degree peel test data for this example is in Table 6. The content of the tackifier mixture and adhesive compositions are in Tables 7 to 9.

Example 6

An adhesive composition was prepared that contained 62 weight percent solids in toluene. The solids contained 50 weight percent LA POLYMER 2140 triblock copolymer, 15 weight percent FORAL 85 solid tackifier, 15 weight percent SUPER ESTER A-75 solid tackifier, and 20 weight percent STAYBELITE ESTER 3-E liquid tackifier. This adhesive composition was knife coated on a 50 micrometer (2 mil) thick polyester film and dried in an oven at 90° C. for 15 minutes to give a dry adhesive coating thickness of approximately 27-30 micrometers (1.1-1.2 mils). The 180 degree peel test data for this example is in Table 6. The content of the tackifier mixture and adhesive compositions are in Tables 7 to 9.

Example 7

An adhesive composition was prepared that contained 62 weight percent solids in toluene. The solids contained 60 weight percent LA POLYMER 2140 triblock copolymer, 10 weight percent FORAL 85 solid tackifier, 10 weight percent SUPER ESTER A-75 solid tackifier, and 20 weight percent STAYBELITE ESTER 3-E liquid tackifier. This adhesive composition was knife coated on a 50 micrometer (2 mil) thick polyester film and dried in an oven at 90° C. for 15 minutes to give a dry adhesive coating thickness of approximately 27-30 micrometers (1.1-1.2 mils). The 180 degree peel test data for this example is in Table 6. The content of the tackifier mixture and adhesive compositions are in Tables 7 to 9. This adhesive composition was also knife coated on a silicone release liner and dried in an oven at 90° C. The resulting film was laminated to a thickness of approximately 2 to 3 mm and subjected to dynamic mechanical testing. The results are shown in FIG. 1.

Example 8

An adhesive composition was prepared that contained 62 weight percent solids in toluene. The solids contained 60 weight percent LA POLYMER 2140 triblock copolymer, 15 weight percent FORAL 85 solid tackifier, 5 weight percent SUPER ESTER A-75 solid tackifier, and 20 weight percent STAYBELITE ESTER 3-E liquid tackifier. This adhesive composition was knife coated on a 50 micrometer (2 mil) thick polyester film and dried in an oven at 90° C. for 15 minutes to give a dry adhesive coating thickness of approximately 27-30 micrometers (1.1-1.2 mils). The 180 degree peel test data for this example is in Table 6. The content of the tackifier mixture and adhesive compositions are in Tables 7 to 9.

Example 9

An adhesive composition was prepared that contained 62 weight percent solids in toluene. The solids contained 10 weight percent LA POLYMER 410 triblock copolymer, 30 weight percent LA POLYMER 2250 triblock copolymer, 5 weight percent FORAL 85 solid tackifier, 35 weight percent SUPER ESTER A-75 solid tackifier, and 20 weight percent STAYBELITE ESTER 3-E liquid tackifier. This adhesive composition was knife coated on a 50 micrometer (2 mil) thick polyester film and dried in an oven at 90° C. for 15 minutes to give a dry adhesive coating thickness of approximately 50 micrometers (2 mils). The 180 degree peel test data for this example is in Table 6. The content of the tackifier mixture and adhesive compositions are in Tables 7 to 9.

Example 10

An adhesive composition was prepared that contained 62 weight percent solids in toluene. The solids contained 30 weight percent LA POLYMER 410 triblock copolymer and 10 weight percent LA POLYMER 2250, 5 weight percent FORAL 85 solid tackifier, 35 weight percent SUPER ESTER A-75 solid tackifier, and 20 weight percent STAYBELITE ESTER 3-E liquid tackifier. This adhesive composition was knife coated on a 50 micrometer (2 mil) thick polyester film and dried in an oven at 90° C. for 15 minutes to give a dry adhesive coating thickness of approximately 50 micrometers (2 mils). The 180 degree peel test data for this example is in Table 6. The content of the tackifier mixture and adhesive compositions are in Tables 7 to 9.

Example 11

An adhesive composition was prepared that contained 62 weight percent solids in toluene. The solids contained 33 weight percent LA POLYMER 2140 triblock copolymer, 7 weight percent LA POLYMER 410 triblock copolymer, 10 weight percent FORAL 85 solid tackifier, 30 weight percent SUPER ESTER A-75 solid tackifier, and 20 weight percent STAYBELITE ESTER 3-E liquid tackifier. This adhesive composition was knife coated on a 50 micrometer (2 mil) thick polyester film and dried in an oven at 90° C. for 15 minutes to give a dry adhesive coating thickness of approximately 27-30 micrometers (1.1-1.2 mils). The 180 degree peel test data for this example is in Table 6. The content of the tackifier mixture and adhesive compositions are in Tables 7 to 9.

Example 12

An adhesive composition was prepared that contained 62 weight percent solids in toluene. The solids contained 27 weight percent LA POLYMER 2140 triblock copolymer, 13 weight percent LA POLYMER 410 triblock copolymer, 10 weight percent FORAL 85 solid tackifier, 30 weight percent SUPER ESTER A-75 solid tackifier, and 20 weight percent STAYBELITE ESTER 3-E liquid tackifier. This adhesive composition was knife coated on a 50 micrometer (2 mil) thick polyester film and dried in an oven at 90° C. for 15 minutes to give a dry adhesive coating thickness of approximately 27-30 micrometers (1.1-1.2 mils). The 180 degree peel test data for this example is in Table 6. The content of the tackifier mixture and adhesive compositions are in Tables 7 to 9.

Example 13

An adhesive composition was prepared that contained 62 weight percent solids in toluene. The solids contained 20 weight percent LA POLYMER 2140, 20 weight percent LA POLYMER 410 triblock copolymer, 10 weight percent FORAL 85 solid tackifier, 20 weight percent SUPER ESTER A-75 solid tackifier, and 20 weight percent STAYBELITE ESTER 3-E liquid tackifier. This adhesive composition was knife coated on a 50 micrometer (2 mil) thick polyester film and dried in an oven at 90° C. for 15 minutes to give a dry adhesive coating thickness of approximately 27-30 micrometers (1.1-1.2 mils). The 180 degree peel test data for this example is in Table 6. The content of the tackifier mixture and adhesive compositions are in Tables 7 to 9.

Comparative Example 1

An adhesive composition was prepared that contained 62 weight percent solids in toluene. The solids contained 40 weight percent LA POLYMER 2140 triblock copolymer, 40 weight percent FORAL 85 solid tackifier, and 20 weight percent STAYBELITE ESTER 3-E liquid tackifier. This adhesive composition was knife coated on a 50 micrometer (2 mil) thick polyester film and dried in an oven at 90° C. for 15 minutes to give a dry adhesive coating thickness of approximately 27-30 micrometers (1.1-1.2 mils). The 180 degree peel test data for this example is in Table 6. The content of the tackifier mixture and adhesive compositions are in Tables 7 to 9.

Comparative Example 2

An adhesive composition was prepared that contained 62 weight percent solids in toluene. The solids contained 50 weight percent LA2140 triblock copolymer, 40 weight percent FORAL 85 solid tackifier, and 10 weight percent STAYBELITE ESTER 3-E liquid tackifier. This adhesive composition was knife coated on a 50 micrometer (2 mil) thick polyester film and dried in an oven at 90° C. for 15 minutes to give a dry adhesive coating thickness of approximately 27-30 micrometers (1.1-1.2 mils). The 180 degree peel test data for this example is in Table 6. The content of the tackifier mixture and adhesive compositions are in Tables 7 to 9.

TABLE 6

180 Degree Peel Strength

| Example or Comparative Example | 180 Degree Peel Strength (N/dm) |
|---|---|
| 1 | 78 |
| 2 | 67 |
| 3 | 82 |
| 4 | 58 |
| 5 | 60 |
| 6 | 53 |
| 7 | 47 |
| 8 | 50 |
| 9 | 51 (shocky) |
| 10 | 55 (shocky) |
| 11 | 51 |
| 12 | 46 |
| 13 | 61 |
| Comparative 1 | 32 |
| Comparative 2 | 35 |

TABLE 7

Content of Adhesive Compositions

| Example | (Meth)acrylate block copolymer (wt %) | First solid tackifier (wt %) | Second solid tackifier (wt %) | Third liquid tackifier (wt %) |
|---|---|---|---|---|
| 1 | 40 | 5 | 35 | 20 |
| 2 | 40 | 10 | 30 | 20 |
| 3 | 40 | 30 | 10 | 20 |
| 4 | 50 | 5 | 25 | 20 |
| 5 | 50 | 10 | 20 | 20 |
| 6 | 50 | 15 | 15 | 20 |
| 7 | 60 | 10 | 10 | 20 |
| 8 | 60 | 15 | 5 | 20 |
| 9 | 40 | 5 | 35 | 20 |
| 10 | 40 | 5 | 35 | 20 |
| 11 | 40 | 10 | 30 | 20 |
| 12 | 40 | 10 | 30 | 20 |
| 13 | 40 | 10 | 30 | 20 |
| Comparative 1 | 40 | 40 | 0 | 20 |
| Comparative 2 | 50 | 40 | 0 | 10 |

TABLE 8

Calculated Chemical Content of Adhesive Composition

| Example | (Meth)acrylate block copolymer (wt %) | Rosin acid and/or ester having three C=C bonds, (wt %) | Rosin acid and/or ester having two C=C bonds, (wt %) | Rosin acid and/or ester having zero or one C=C bond, (wt %) |
|---|---|---|---|---|
| 1 | 40 | 20.6 | 12.1 | 27.3 |
| 2 | 40 | 18.5 | 11.7 | 29.8 |
| 3 | 40 | 9.9 | 10.3 | 39.8 |
| 4 | 50 | 15.4 | 11.1 | 23.6 |
| 5 | 50 | 13.2 | 10.8 | 26.1 |
| 6 | 50 | 11.1 | 10.4 | 28.5 |
| 7 | 60 | 7.9 | 9.8 | 22.3 |
| 8 | 60 | 5.8 | 9.4 | 24.8 |
| 9 | 40 | 20.6 | 12.1 | 27.3 |
| 10 | 40 | 20.6 | 12.1 | 27.3 |
| 11 | 40 | 18.5 | 11.7 | 29.8 |
| 12 | 40 | 18.5 | 11.7 | 29.8 |
| 13 | 40 | 18.5 | 11.7 | 29.8 |
| Comparative 1 | 40 | 5.6 | 9.6 | 44.8 |
| Comparative 2 | 50 | 4.8 | 5.3 | 39.9 |

TABLE 9

Content of Tackifier Mixture

| Example or Comparative Example | First solid tackifier, (wt %) | Second solid tackifier, (wt %) | Third liquid tackifier, (wt %) |
|---|---|---|---|
| 1 | 8.3 | 58.4 | 33.3 |
| 2 | 16.7 | 50 | 33.3 |
| 3 | 50 | 16.7 | 33.3 |
| 4 | 10 | 50 | 40 |
| 5 | 20 | 40 | 40 |
| 6 | 30 | 30 | 40 |
| 7 | 25 | 25 | 50 |
| 8 | 37.5 | 12.5 | 50 |
| 9 | 8.3 | 58.4 | 33.3 |
| 10 | 8.3 | 58.4 | 33.3 |
| 11 | 16.7 | 50 | 33.3 |
| 12 | 16.7 | 50 | 33.3 |
| 13 | 16.7 | 50 | 33.3 |
| Comparative 1 | 66.7 | 0 | 33.3 |
| Comparative 2 | 80 | 0 | 20 |

TABLE 10

Calculated Chemical Content of Tackifier Mixture

| Example or Comparative Example | Rosin acid and/or ester having three C=C bonds, (wt %) | Rosin acid and/or ester having two C=C bonds, (wt %) | Rosin acid and/or ester having zero or one C=C bond, (wt %) |
|---|---|---|---|
| 1 | 34.3 | 20.2 | 45.4 |
| 2 | 30.8 | 34.3 | 35.0 |
| 3 | 16.5 | 17.0 | 66.5 |
| 4 | 30.8 | 22.0 | 47.2 |
| 5 | 24.4 | 23.4 | 52.2 |
| 6 | 22.2 | 20.8 | 57.0 |
| 7 | 19.8 | 24.4 | 55.8 |
| 8 | 14.5 | 23.5 | 62.0 |
| 9 | 34.3 | 20.2 | 45.4 |
| 10 | 34.3 | 20.2 | 45.4 |
| 11 | 30.8 | 19.5 | 49.7 |
| 12 | 30.8 | 19.5 | 49.7 |
| 13 | 30.8 | 19.5 | 49.7 |
| Comparative 1 | 9.3 | 16.0 | 74.7 |
| Comparative 2 | 9.6 | 10.6 | 79.8 |

Comparative Example 3

An adhesive composition was prepared that contained 62 weight percent solids in toluene. The solids contained 60 weight percent LA POLYMER 2140 triblock copolymer, 20 weight percent FORAL 85 solid tackifier, and 20 weight percent STAYBELITE ESTER 3-E liquid tackifier. This adhesive composition was knife coated on a silicone release liner and dried in an oven at 90° C. The resulting film was laminated to approximately 2-3 mm thickness and subjected to dynamic mechanical testing. The results are shown in FIG. 1.

Comparative Example 4

An adhesive composition was prepared that contained 62 weight percent solids in toluene. The solids contained 60 weight percent LA POLYMER 2140 triblock copolymer, 20 weight percent SUPERESTER A-75 solid tackifier, and 20 weight percent STAYBELITE ESTER 3-E liquid tackifier. This adhesive composition was knife coated on a silicone release liner and dried in an oven at 90° C. The resulting film was laminated to approximately 2-3 mm thickness and subjected to dynamic mechanical testing. The results are shown in FIG. 1.

Example 14

An adhesive composition was prepared that contained 50 weight percent LA POLYMAR 410 triblock copolymer, 10 weight percent FORAL 85 solid tackifier, 20 weight percent SUPERESTER A-75 solid tackifier and 20 weight percent STAYBELITE ESTER 3E liquid tackifier. The adhesive composition was compounded in a 25 millimeter twin screw extruder made by Thermo Scientific Haake Corporation, Milwaukee, Wis. The melt temperature was maintained at 300 F and the adhesive was coated as a transfer adhesive on a silicone release liner described in Table 1 at an adhesive thickness of approximately 50 micrometers (2 mils).

Examples 15

The transfer adhesive as described in Example 14 was employed to construct a 45 mil (1.1 mm) thick acrylic foam tape having adhesive layers of the instant invention on both faces of the foam. Primer, a 10% solids solution of a polyamide resin (Macromelt 6240 from Henkel, Inc.) in a solvent blend having 47.5 parts isopropanol, 47.5 parts n-propanol and 5 parts water, was applied on top of the adhesive transfer tape, using a foam brush and dried at ambient temperature for 10 minutes to provide a dry primer thickness of 0.00033 in (0.0083 mm). The primed transfer tape was rolled down by hand onto each side of the acrylic foam, primer side to foam, and then fed through a 115° F. (45° C.). heated laminator at a rate of 7.5 ft/min (2.3 m/min) to obtain a foam tape construction.

The acrylic foam was made as described in Example 7 of U.S. Pat. No. 4,749,590 (Klingen et al.) with the following exception. After the partial polymerization and before frothing, 0.19 part of additional 2,2-dimethoxy-2-phenyl acetophenone (available as IRGACURE 651 from Ciba Specialty Chemicals, Tarrytown, N.Y.), 0.55 part 1,6-hexanediol diacrylate (available as SR-238 from Sartomer, Exton, Pa.), 2 parts hydrophobic fumed silica (available as HDK H15P from Wacker-Chemie GMBH, Munich, Germany), 8 parts glass microspheres (available as K-15 from 3M, St. Paul, Minn.), 0.57 part black pigment, and 1.54 parts surfactants were added to 100 parts of the syrup. The black pigment was a dispersion of 4.6 parts carbon black (available as Monarch 120 from Cabot Corporation, Billerica, Mass.) in 80.0 parts polypropylene glycol and 15.4 parts anhydrous stannous chloride. The surfactants were described in Example 1 of U.S. Pat. No. 5,024,880.

The pressure sensitive foam tape thus adhered to various substrates to evaluate 90 degree peel strength. The data for adhesion to polypropylene (PP), high density polyethylene (HDPE), and stainless steel (SS) are shown in Table 11.

TABLE 11

90 Degree Peel strength

| Example | 90 Degree Peel Strength to PP (N/dm) | 90 Degree Peel Strength to HDPE (N/dm) | 90 Degree Peel Strength to SS (N/dm) |
|---|---|---|---|
| 15 | 233 | 186 | 286 |

We claim:
1. An adhesive composition comprising:
   a) a block copolymer comprising
      at least two A endblock polymeric units that are each derived from a first monoethylenically unsaturated monomer comprising a methacrylate, styrene, or combination thereof, wherein each A endblock has a glass transition temperature of at least 50° C.; and
      at least one B midblock polymeric unit that is derived from a second monoethylenically unsaturated monomer comprising a (meth)acrylate, vinyl ester, or combination thereof, wherein each B midblock has a glass transition temperature no greater than 20° C.; and
   b) a tackifier mixture comprising
      1) a first solid tackifier having a glass transition temperature greater than or equal to 20° C. and comprising at least 70 weight percent of a first rosin acid, first rosin ester, or mixture thereof having zero or one carbon-carbon double bond;
      2) a second solid tackifier having a glass transition temperature greater than or equal to 20° C. and comprising no greater than 50 weight percent of the first rosin acid, first rosin ester, or mixture thereof having zero or one carbon-carbon double bond; and
      3) a liquid tackifier having a glass transition temperature less than or equal to 0° C., wherein the liquid tackifier comprises a rosin acid, a rosin ester, or a mixture thereof.

2. The adhesive composition of claim 1, wherein the adhesive composition comprises 30 to 70 weight percent of the block copolymer and 30 to 70 weight percent of the tackifier mixture based on the total weight of the block copolymer and the tackifier mixture.

3. The adhesive composition of claim 1, wherein the adhesive composition comprises 40 to 60 weight percent of the block copolymer and 40 to 60 weight percent of the tackifier mixture based on the total weight of the block copolymer and the tackifier mixture.

4. The adhesive composition of claim 1, wherein the block copolymer is a triblock copolymer and each A endblock comprises the reaction product of alkyl methacrylate monomers and the B midblock comprises the reaction product of alkyl (meth)acrylate monomers.

5. The adhesive composition of claim 1, wherein the block copolymer comprises 15 to 50 weight percent A endblocks and 50 to 85 weight percent B midblock based on the total weight of the block copolymer.

6. The adhesive composition of claim 1, wherein no greater than 1 weight percent of the first monoethylenically unsaturated monomer is a first acidic monomer and no greater than 1 weight percent of the second monoethylenically unsaturated monomer is a second acidic monomer.

7. The adhesive composition of claim 1, wherein the first solid tackifier comprises 1) at least 70 weight percent of a first rosin acid, a first rosin ester, or mixture thereof having zero or one carbon-carbon double bond, 2) less than 20 weight percent of a second rosin acid, second rosin ester, or mixture thereof having two carbon-carbon double bonds, and 3) less than 20 weight percent of a third rosin acid, third rosin ester, or mixture thereof having three carbon-carbon double bonds.

8. The adhesive composition of claim 1, wherein the second solid tackifier comprises 1) no greater than 50 weight percent of a first rosin acid, first rosin ester, or mixture thereof having zero or one carbon-carbon double bond, 2) at least 5 weight percent of a second rosin acid, a second rosin ester, or mixture thereof having two carbon-carbon double bonds, and 3) at least 20 weight percent of a third rosin acid, third rosin ester, or mixture thereof having three carbon-carbon double bonds.

9. The adhesive composition of claim 1, further comprising a diblock copolymer.

10. The adhesive composition of claim 1, wherein the block copolymer comprises a first block copolymer having a first weight average molecular weight and a second block copolymer having a second weight average molecular weight that is larger than the first weight average molecular weight by at least 25 percent.

11. The adhesive composition of claim 1, wherein the block copolymer comprises a first block copolymer having a first weight percent A block and a second block copolymer having a second weight percent A block that is larger than the first weight percent A block by at least 20 percentage units.

12. An article comprising a first substrate and an adhesive composition adjacent to a surface of the first substrate, wherein the adhesive composition comprises:
   a) a block copolymer comprising
      at least two A endblock polymeric units that are each derived from a first monoethylenically unsaturated monomer comprising a methacrylate, styrene, or combination thereof, wherein each A endblock has a glass transition temperature of at least 50° C.; and
      at least one B midblock polymeric unit that is derived from a second monoethylenically unsaturated monomer comprising a (meth)acrylate, vinyl ester, or combination thereof, wherein each B midblock has a glass transition temperature no greater than 20° C.; and
   b) a tackifier mixture comprising
      1) a first solid tackifier having a glass transition temperature greater than or equal to 20° C. and comprising at least 70 weight percent of a first rosin acid, first rosin ester, or mixture thereof having zero or one carbon-carbon double bond;
      2) a second solid tackifier having a glass transition temperature greater than or equal to 20° C. and comprising no greater than 50 weight percent of the first rosin acid, first rosin ester, or mixture thereof having zero or one carbon-carbon double bond; and
      3) a liquid tackifier having a glass transition temperature less than or equal to 0° C., wherein the liquid tackifier comprises a rosin acid, a rosin ester, or a mixture thereof.

13. The article of claim 12, wherein the first substrate comprises a film or foam.

14. The article of claim 12, further comprising a second substrate, wherein the adhesive layer is positioned between the first substrate and the second substrate.

15. The article of claim 14, wherein at least one of the first substrate or the second substrate comprises a non-polar surface.

16. The article of claim 12, wherein the adhesive composition comprises 30 to 70 weight percent of the block copolymer and 30 to 70 weight percent of the tackifier mixture based on the total weight of the block copolymer and the tackifier mixture.

17. The article of claim 12, wherein the block copolymer is a triblock copolymer and each A endblock comprises the reaction product of alkyl methacrylate monomers and the B midblock comprises the reaction product of alkyl (meth)acrylate monomers.

18. The article of claim 12, wherein no greater than 1 weight percent of the first monoethylenically unsaturated monomer is a first acidic monomer and no greater than 1 weight percent of the second monoethylenically unsaturated monomer is a second acidic monomer.

19. An adhesive composition comprising:
    a) a block copolymer comprising
        at least two A endblock polymeric units that are each derived from a first monoethylenically unsaturated monomer comprising a methacrylate, styrene, or combination thereof, wherein each A endblock has a glass transition temperature of at least 50° C.; and
        at least one B midblock polymeric unit that is derived from a second monoethylenically unsaturated monomer comprising a (meth)acrylate, vinyl ester, or combination thereof, wherein each B midblock has a glass transition temperature no greater than 20° C.; and
    b) a tackifier mixture comprising
        1) 30 to 70 weight percent weight percent of a first rosin acid, first rosin ester, or mixture thereof having zero or one carbon-carbon bond;
        2) 10 to 40 weight percent of a second rosin acid, second rosin ester, or mixture thereof having two carbon-carbon double bonds; and
        3) 10 to 50 weight percent of a third rosin acid, third rosin ester, or mixture thereof having three carbon-carbon double bonds.

20. An article comprising a first substrate and an adhesive composition adjacent to a surface of the first substrate, wherein the adhesive composition comprises:
    a) a block copolymer comprising
        at least two A endblock polymeric units that are each derived from a first monoethylenically unsaturated monomer comprising a methacrylate, styrene, or combination thereof, wherein each A endblock has a glass transition temperature of at least 50° C.; and
        at least one B midblock polymeric unit that is derived from a second monoethylenically unsaturated monomer comprising a (meth)acrylate, vinyl ester, or combination thereof, wherein each B midblock has a glass transition temperature no greater than 20° C.; and
    b) a tackifier mixture comprising
        1) 30 to 70 weight percent weight percent of a first rosin acid, first rosin ester, or mixture thereof having zero or one carbon-carbon bond;
        2) 10 to 40 weight percent of a second rosin acid, second rosin ester, or mixture thereof having two carbon-carbon double bonds; and
        3) 10 to 50 weight percent of a third rosin acid, third rosin ester, or mixture thereof having three carbon-carbon double bonds.

* * * * *

UNITED STATES PATENT AND TRADEMARK OFFICE
CERTIFICATE OF CORRECTION

Page 1 of 2

PATENT NO. : 8,551,616 B2
APPLICATION NO. : 12/994877
DATED : October 8, 2013
INVENTOR(S) : Gene G. Joseph et al.

It is certified that error appears in the above-identified patent and that said Letters Patent is hereby corrected as shown below:

In the Specification

Column 4
Lines 2-3 (approx.), delete "calorimetry" and insert -- Calorimetry --, therefor.

Column 7
Line 57, delete "form" and insert -- from --, therefor.

Column 13
Lines 58-66 (approx.), delete

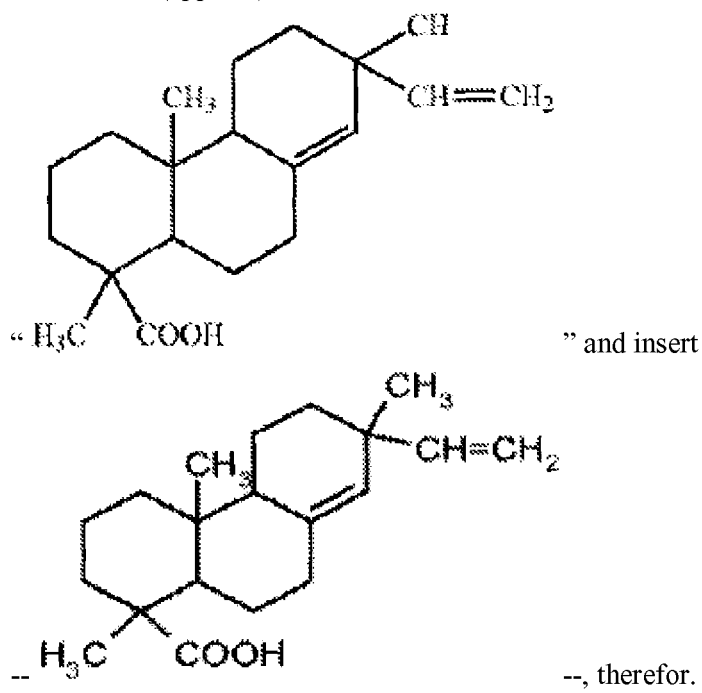

" and insert

-- , therefor.

Signed and Sealed this
Eighth Day of April, 2014

Michelle K. Lee
*Deputy Director of the United States Patent and Trademark Office*

CERTIFICATE OF CORRECTION (continued)
U.S. Pat. No. 8,551,616 B2

Column 14
Line 42 (approx.), delete "thereof" and insert -- thereof. --, therefor.

Column 27
Line 36 (approx.), delete "backing" and insert -- backing. --, therefor.

Column 28
Line 16 (approx.), delete "Viscoteck" and insert -- Viscotek --, therefor.

Column 30
Line 20 (approx.), delete "copolymer," and insert -- copolymer, 5 --, therefor.

Column 31
Line 1, delete "copolymer," and insert -- copolymer, 5 --, therefor.